(12) United States Patent
Furuta

(10) Patent No.: US 9,175,159 B2
(45) Date of Patent: Nov. 3, 2015

(54) THERMOPLASTIC ELASTOMER COMPOSITION

(71) Applicant: ARONKASEI CO., LTD., Minato-ku (JP)

(72) Inventor: Madoka Furuta, Tokai (JP)

(73) Assignee: ARONKASEI CO., LTD., Minato-ku (JP)

( * ) Notice: Subject to any disclaimer, the term of this patent is extended or adjusted under 35 U.S.C. 154(b) by 0 days.

(21) Appl. No.: 14/371,546

(22) PCT Filed: Jan. 17, 2013

(86) PCT No.: PCT/JP2013/050799
§ 371 (c)(1),
(2) Date: Jul. 10, 2014

(87) PCT Pub. No.: WO2013/108836
PCT Pub. Date: Jul. 25, 2013

(65) Prior Publication Data
US 2014/0357775 A1    Dec. 4, 2014

(30) Foreign Application Priority Data

Jan. 19, 2012  (JP) ................. 2012-008975

(51) Int. Cl.
*C08L 53/00*  (2006.01)
*C08J 5/00*  (2006.01)
*C08L 67/02*  (2006.01)
(Continued)

(52) U.S. Cl.
CPC ............... *C08L 53/00* (2013.01); *B29C 43/003* (2013.01); *C08J 5/00* (2013.01); *C08K 5/098* (2013.01);
(Continued)

(58) Field of Classification Search
CPC ......... C08L 53/00; C08L 67/02; C08L 63/00; C08L 77/00
USPC ................................................ 525/92 B, 92 F
See application file for complete search history.

(56) References Cited

U.S. PATENT DOCUMENTS
7,842,754 B2 *  11/2010  Kano et al. ...................... 525/64
2004/0183702 A1    9/2004  Nachtigal et al.
(Continued)

FOREIGN PATENT DOCUMENTS
JP      3-221578 A      9/1991
JP   2003-119249 A     4/2003
(Continued)

OTHER PUBLICATIONS
International Search Report issued Apr. 16, 2013, in PCT/JP2013/050799.

*Primary Examiner* — Vu A Nguyen
(74) *Attorney, Agent, or Firm* — Oblon, McClelland, Maier & Neustadt, L.L.P.

(57)  ABSTRACT

A thermoplastic elastomer composition containing a (meth)acrylic elastomer (component A), a thermoplastic resin having a melting point of from 180° to 350° C., and having a functional group reactive with an epoxy group (component B), and a vinyl copolymer having a solubility in tetrahydrofuran and having two or more epoxy groups in one molecule, on average (component C), wherein proportions of each of the components are: 40 to 95 parts by weight of the (meth)acrylic elastomer (component A), 5 to 60 parts by weight of the thermoplastic resin (component B), and 0.1 to 30 parts by weight of the vinyl copolymer (component C), a total of the (meth)acrylic elastomer (component A) and the thermoplastic resin (component B) being 100 parts by weight, wherein the component C is constituted by monomer units containing 50% by weight or more of monomer units (monomer unit c1) of which SP value is from 17.5 to 25.0, and wherein a flow beginning temperature is from 180° to 350° C. The molded article obtainable from the thermoplastic elastomer composition of the present invention can be used in various kinds of fields such as electric and electronic parts, automotive parts, sealants, packing, vibration proofed materials, and tubes.

20 Claims, 6 Drawing Sheets

(51) Int. Cl.
*B29C 43/00* (2006.01)
*C08K 5/098* (2006.01)
*C08L 33/06* (2006.01)
*C08L 77/00* (2006.01)
*C08L 101/00* (2006.01)
*B29K 33/00* (2006.01)
*B29K 67/00* (2006.01)
*B29K 105/00* (2006.01)

(52) U.S. Cl.
CPC .................. *C08L 33/06* (2013.01); *C08L 67/02* (2013.01); *C08L 77/00* (2013.01); *C08L 101/00* (2013.01); *B29K 2033/12* (2013.01); *B29K 2067/006* (2013.01); *B29K 2105/0088* (2013.01); *B29K 2105/25* (2013.01); *C08J 2353/00* (2013.01); *C08J 2367/02* (2013.01); *C08L 33/068* (2013.01)

(56) References Cited

U.S. PATENT DOCUMENTS

| | | |
|---|---|---|
| 2005/0085592 A1 | 4/2005 | Taniguchi et al. |
| 2005/0272865 A1 | 12/2005 | Taniguchi et al. |
| 2005/0275565 A1 | 12/2005 | Nachtigal et al. |
| 2010/0160565 A1* | 6/2010 | Wu et al. ................ 525/221 |

FOREIGN PATENT DOCUMENTS

| | | |
|---|---|---|
| JP | 2004-35637 A | 2/2004 |
| JP | 2006-124724 A | 5/2006 |
| JP | 2007-92038 A | 4/2007 |
| JP | 2007-525542 A | 9/2007 |
| JP | 2009-79119 A | 4/2009 |
| WO | WO 2012/173241 A1 | 12/2012 |

* cited by examiner

THERMOPLASTIC ELASTOMER COMPOSITION

TECHNICAL FIELD

The present invention relates to a thermoplastic elastomer composition for use in electric and electronic parts, automotive parts, sealants, packing, vibration-proof materials, tubes, and the like, and a molded article obtainable by thermally molding the thermoplastic elastomer composition.

BACKGROUND ART

Patent Publication 1 discloses, as a thermoplastic elastomer composition for use in key pads, having excellent flexibility, heat resistance, adhesion, clicking feel, and recycle use, a thermoplastic elastomer composition for use in key pads, characterized in that the thermoplastic elastomer composition contains a block copolymer (A) comprising a (meth)acrylic polymer block (a) and a (meth)acrylic polymer block (b), wherein (a) and (b) are different from each other, as an essential component.

Patent Publication 2 discloses, as an objective of providing a thermoplastic elastomer (block copolymer) having excellent heat-resistant degradability, and having excellent heat resistance that shows excellent rubber elasticity even at high temperatures, a composition containing a thermoplastic resin and a block copolymer (A) comprising (a) a (meth)acrylic polymer block and (b) an acrylic polymer block, the composition being prepared by dynamically treating these components.

Patent Publication 3 discloses as an objective of providing a molded article made of a resin composition having excellent molding processability, recycle use, flexibility, elastic properties, heat resistance, oil resistance, weathering resistance, transparency, cohesiveness with substrates, and the like, a resin composition containing an acrylic block copolymer (A) comprising a methacrylic polymer block (a) and an acrylic polymer block (b), and at least one member selected from the group consisting of a thermoplastic resin (B), a thermoplastic elastomer (C), a rubber (D), and a thermosetting resin (E).

Patent Publication 4 discloses as an objective of providing a resin composition having excellent surface hardness, and in preferred embodiments having excellent rigidity, a resin composition comprising a blend of 1 to 200 parts by weight of an acrylic resin (B), and 0.1 to 100 parts by weight of a compatibilizing agent (C) having one or more functional groups selected from a glycidyl group, an acid anhydride group, and a carboxyl group, based on 100 parts by weight of a thermoplastic polyester resin (A).

PRIOR ART PUBLICATIONS

Patent Publications

Patent Publication 1: Japanese Patent Laid-Open No. 2004-35637
Patent Publication 2: Japanese Patent Laid-Open No. 2006-124724
Patent Publication 3: Japanese Patent Laid-Open No. 2009-79119
Patent Publication 4: Japanese Patent Laid-Open No. 2007-92038

SUMMARY OF THE INVENTION

Problems to be Solved by the Invention

However, the thermoplastic elastomer compositions described in Patent Publications 1 to 3 are greatly dependent on molding conditions, particularly a temperature, so that their use is limited. In addition, the resin composition described in Patent Publication 4 is a resin composition having a high surface hardness and excellent rigidity so that the resin composition can be used in various kinds of containers such as tableware, washbowls, and plant pots, housing appliances such as floor materials, wall materials and washbasins; decorating articles such as tabletops, picture or painting frames, and dolls, not an elastomer composition.

An object of the present invention is to provide a thermoplastic elastomer composition capable of giving a molded article having excellent flexibility and heat resistance and excellent tensile strength, and having a low molding temperature dependence for allowing the molded article to exhibit excellent flexibility and heat resistance, and a molded article obtainable by thermally molding the thermoplastic elastomer.

Means to Solve the Problems

The present invention relates to:
[1] a thermoplastic elastomer composition containing:
a (meth)acrylic elastomer (component A),
a thermoplastic resin having a melting point of from 180° to 350° C., and having a functional group reactive with an epoxy group (component B), and
a vinyl copolymer having a solubility in tetrahydrofuran and having two or more epoxy groups in one molecule, on average (component C),
wherein proportions of each of the components are:
40 to 95 parts by weight of the (meth)acrylic elastomer (component A),
5 to 60 parts by weight of the thermoplastic resin (component B), and
0.1 to 30 parts by weight of the vinyl copolymer (component C),
a total of the (meth)acrylic elastomer (component A) and the thermoplastic resin (component B) being 100 parts by weight,
wherein the component C is constituted by monomer units containing 50% by weight or more of monomer units (monomer unit c1) of which SP value is from 17.5 to 25.0, and
wherein a flow beginning temperature is from 180° to 350° C.,
[2] a thermoplastic elastomer composition containing:
a (meth)acrylic elastomer (component A),
a thermoplastic resin having a melting point of from 180° to 350° C., and having a functional group reactive with an epoxy group (component B), and
a vinyl copolymer having a solubility in tetrahydrofuran and having two or more epoxy groups in one molecule, on average (component C),
wherein proportions of each of the components are:
40 to 95 parts by weight of the (meth)acrylic elastomer (component A),
5 to 60 parts by weight of the thermoplastic resin (component B), and
0.1 to 30 parts by weight of the vinyl copolymer (component C),
a total of the (meth)acrylic elastomer (component A) and the thermoplastic resin (component B) being 100 parts by weight,
wherein the component C is constituted by monomer units containing 50% by weight or more of at least one monomer unit selected from the group consisting of (meth)acrylic monomers, styrene, and styrene derivatives (monomer unit c2), with proviso that of the monomers of which SP values are specified, those having SP values of less than 17.5 and those exceeding 25.0 are excluded, and wherein a flow beginning temperature is from 180° to 350° C.;

[3] a molded article having a flow beginning temperature of from 180° to 350° C., obtainable by thermally molding at 180° to 350° C. a thermoplastic elastomer composition as defined in the above [1] or [2];

[4] a molded article having a tensile elongation at break of 100% or more, obtainable by thermally molding at 180° to 350° C. a thermoplastic elastomer composition as defined in the above [1] or [2]; and

[5] a molded article having A hardness of from 20 to 90, obtainable by thermally molding at 180° to 350° C. a thermoplastic elastomer composition as defined in the above [1] or [2].

Effects of the Invention

The thermoplastic elastomer composition of the present invention has some effects of being capable of giving a molded article having excellent flexibility and heat resistance and excellent tensile strength, and having a low molding temperature dependence for allowing the molded article to exhibit excellent flexibility and heat resistance, so that the limitations on the molding conditions upon processing into a molded article are small.

Specifically, some effects are exhibited that even when subjected to thermal molding at a temperature at which sufficient flowability for molding is obtained (a temperature H described later), flexibility and heat resistance do not undergo significant changes (especially heat resistance hardly is lowered), as compared to a case when subjected to thermal molding at a temperature in which a component A forming a continuous phase is allowed to flow, but a component B forming a dispersed phase does not melt (a temperature L described later).

MODES FOR CARRYING OUT THE INVENTION

Figure 1:
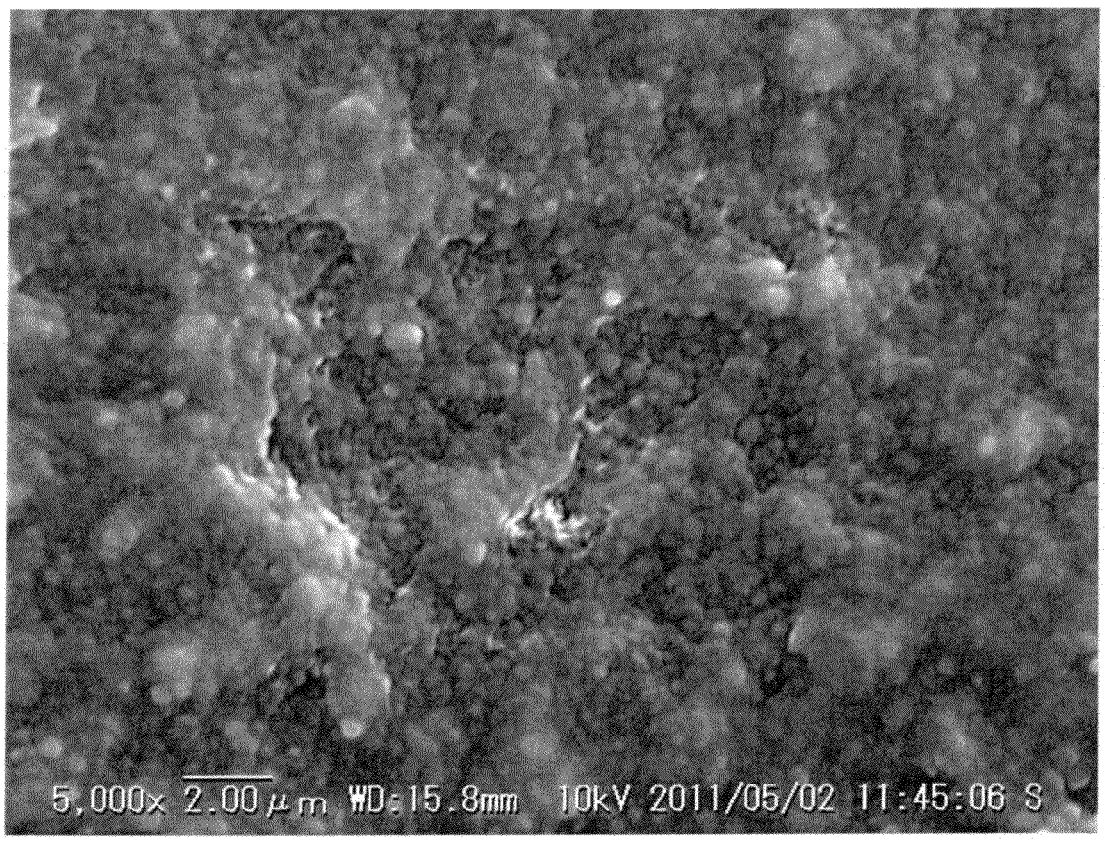
FIG. 1 is a photograph of a scanning electron microscope (SEM) of a cross section of a pressed sheet at 200° C. obtained from the composition of Example 1 (5,000 folds).

The thermoplastic elastomer composition of the present invention contains:
a (meth)acrylic elastomer (component A),
a thermoplastic resin having a melting point of from 180° to 350° C., and having a functional group reactive with an epoxy group (component B), and
a vinyl copolymer having a solubility in tetrahydrofuran and having two or more epoxy groups in one molecule, on average, wherein the vinyl copolymer is constituted by particular monomer units (component C), in specified proportions. In the thermoplastic elastomer composition of the present invention, the component A forms a continuous phase, and the component B forms a dispersed phase. The component C functions as a compatibilizing agent for stabilizing the size (particle size) of the component B (dispersed phase) in the component A that forms a continuous phase, and the thermoplastic elastomer composition of the present invention has some features that the thermoplastic elastomer composition is capable of giving a molded article having excellent flexibility and heat resistance, and has a low molding temperature dependence for allowing the molded article to exhibit excellent flexibility and heat resistance, so that the limitations on the molding conditions upon processing into a molded article are small.

It is preferable that the (meth)acrylic elastomer (component A) has as constituents two or more (meth)acrylic monomers and optionally other copolymerizable vinyl monomers, and the (meth)acrylic elastomer is obtained by polymer formation (polymerization) according to a polymerization reaction.

The (meth)acrylic monomer includes, for example, methyl (meth)acrylate, ethyl (meth)acrylate, propyl (meth)acrylate, butyl (meth)acrylate, 2-ethylhexyl(meth)acrylate, cyclohexyl (meth)acrylate, (meth)acrylic acid, hydroxyethyl (meth)acrylate, hydroxypropyl (meth)acrylate, glycidyl (meth)acrylate, methoxyethyl (meth)acrylate, ethoxyethyl (meth)acrylate, butoxyethyl (meth)acrylate, phenoxyethyl (meth)acrylate, and the like. Here, when expressed as (meth)acryl in the present specification, the term means both methacryl and acryl.

The amount of the (meth)acrylic monomer is preferably 20% by mol or more, more preferably 50% by mol or more, and even more preferably 80% by mol or more, of the constituents.

Other copolymerizable vinyl monomers include styrene, α-methylstyrene, vinyl acetate, ethylene, propylene, butadiene, isoprene, maleic anhydride, and the like, among which styrene, α-methylstyrene, and ethylene are preferred.

The polymerization methods of monomers for obtaining a (meth)acrylic elastomer include, for example, a radical polymerization method, a living anion polymerization method, a living radical polymerization method, and the like. In addition, the forms of polymerization include, for example, a solution polymerization method, an emulsion polymerization method, a suspension polymerization method, a bulk polymerization method, and the like.

It is preferable that the component A is a block copolymer comprising two or more blocks constituting hard segments, and one or more blocks constituting soft segments.

In order to have the component A forming a continuous phase exhibit the properties as the thermoplastic elastomer, it is preferable that the component has a hard segment having a glass transition temperature of equal to higher than a room temperature.

The vinyl monomer constituting a hard segment is preferably methyl methacrylate, and acrylonitrile, styrene, α-methylstyrene or the like can be used within the range that would not hamper the object of the present invention, which is in an amount of preferably 30% by weight or less, more preferably 20% by weight or less, and even more preferably 10% by weight or less.

The glass transition temperature of the block constituting a hard segment is preferably from 20° to 200° C., more preferably from 30° to 180° C., and even more preferably from 50° to 150° C. When the glass transition temperature of the block constituting a hard segment is too low, the resulting composition may have unsatisfactory heat resistance. Blocks having glass transition temperatures exceeding 200° C. are difficult to have the raw materials available.

The vinyl monomer constituting a soft segment includes ethyl (meth)acrylate, butyl (meth)acrylate, methoxyethyl (meth)acrylate, ethoxyethyl (meth)acrylate, and the like.

The glass transition temperature of the block constituting a soft segment is preferably from −100° to 19° C., more preferably from −80° to 10° C., and even more preferably from −70° to 0° C. When the glass transition temperature of the block constituting a soft segment is too high, the resulting composition may have unsatisfactory flexibility. Blocks having glass transition temperatures lower than −100° C. are difficult to have the raw materials available.

A weight ratio of the hard segment to the soft segment in the component A, i.e. hard segment/soft segment, is preferably from 10/90 to 70/30, and more preferably from 15/85 to 50/50, from the viewpoint of giving an appropriate flexibility to the component A.

Commercially products that are utilizable as the component A include KURARITY manufactured by KURARAY CO., LTD., Nanostrength manufactured by ARKEMA, NABSTER manufactured by Kaneka Corporation, and the like.

The weight-average molecular weight of the component A is preferably 50,000 or more, more preferably 70,000 or more, and even more preferably 100,000 or more, from the viewpoint of mechanical properties such as tensile strength. In addition, the weight-average molecular weight is preferably 1,000,000 or less, more preferably 800,000 or less, and even more preferably 700,000 or less, from the viewpoint of easy handling and maintenance of melt viscosities suitable also in the production of a molded article by injection molding or the like. From these viewpoints, the weight-average molecular weight of the component A is preferably from 50,000 to 1,000,000, more preferably from 70,000 to 800,000, and even more preferably from 100,000 to 700,000. In the present invention, the component A may be polymerized with a transesterification catalyst, a radical polymerization initiator, or the like, to a size of more than the weight-average molecular weight of the component A in the raw material stage. The distribution of the weight-average molecular weight in that case would have a distribution having a wider breath or multi-peaks (having two or more peaks), and the above-mentioned weight-average molecular weight is an averaged molecular weight of the entire distribution.

The A hardness of the component A is preferably from 5 to 90, and more preferably from 10 to 80, from the viewpoint of flexibility of the composition.

The flow beginning temperature of the component A is preferably 80° C. or higher, from the viewpoint of heat resistance of the composition, and the flow beginning temperature is preferably 220° C. or lower, from the viewpoint of thermoplasticity (flowability) of the composition. From these viewpoints, the flow beginning temperature of the component A is preferably from 80° to 220° C., and more preferably from 100° to 200° C.

The component B is a thermoplastic resin having a functional group reactive with an epoxy group. It is preferable that the component is a crystalline thermoplastic resin having a high melting point, from the viewpoint of giving heat resistance to the composition of the present invention. From these viewpoints, the melting point of the thermoplastic resin is 180° C. or higher, preferably 190° C. or higher, and more preferably 200° C. or higher. In addition, the melting point is 350° C. or lower, preferably 330° C. or lower, and more preferably 300° C. or lower. The melting point of the thermoplastic resin is from 180° to 350° C., preferably from 190° to 330° C., and more preferably from 200° to 300° C. When the melting point exceeds 350° C., pyrolysis of the (meth)acrylic elastomer takes place, so that the composition of the present invention cannot be substantially produced. The crystalline thermoplastic resin refers to a thermoplastic resin of which melting point is observed with a differential scanning calorimeter (DSC).

The functional group reactive with an epoxy group includes a hydroxyl group, a carboxyl group, an acid anhydride group, an amide group, an amino group, and the like. The thermoplastic resin as the component B has one or more of these functional groups in a main chain or a side chain of the thermoplastic resin.

A thermoplastic resin without having a functional group reactive with an epoxy group does not react with a compatibilizing agent the component C, so that the thermoplastic resin has worsened dispersion in the component A, and whereby a thermoplastic elastomer having excellent flexibility and heat resistance cannot be obtained.

A thermoplastic resin having a melting point of 180° C. or higher, and having a functional group reactive with an epoxy group is preferably an aromatic polyester and/or a polyamide, from the viewpoint of heat resistance (high melting point) and incompatibility with the component A. The aromatic polyester includes polyethylene terephthalate, polybutylene terephthalate, polyethylene naphthalate, and the like. The polyamide includes nylon 6, nylon 66, and the like.

The melting point of the component B is preferably 20° C. or more higher than the flow beginning temperature of the component A, more preferably 30° C. or more higher, and even more preferably 40° C. or more higher, from the viewpoint of dispersing the component B, which is a thermoplastic resin having relatively large heat resistance, in the component A, which is an elastomer having relatively low heat resistance, thereby making the heat resistance of the resulting thermoplastic elastomer composition to be larger than that of the component A.

It is important that the component B has poor compatibility with the component A. If the compatibility between both the components is excellent, the composition would have worsened flexibility, so that the features of the elastomer may be hampered in some cases.

The melt viscosity can be used as an index for a molecular weight for each of the resins so long as the resins have the same monomer composition. In the present invention, the melt viscosity of the component B at a temperature of a melting point +15° C. and a shearing rate of 1,216 $sec^{-1}$, is preferably from 50 Pa·s to 2,000 Pa·s, from the viewpoint of heat resistance.

As the functional group of the molecular terminal the polyester, a hydroxyl group and a carboxyl group are present. Each of the existing amount of the hydroxyl group and the carboxyl group at the molecular terminal of the polyester usable as the component B in the present invention is not particularly limited, and a general existing amount can be used. For example, in a case where the component B is a polyester, an acid value that is used as an index for the amount of the carboxyl group is preferably from 0.1 to 100 meq/kg. More specifically, the acid value is preferably 0.1 meq/kg or more, more preferably 1 meq/kg or more, even more preferably 3 meq/kg or more, and even more preferably 5 meq/kg or more. In addition, the acid value is preferably 100 meq/kg or less, more preferably 80 meq/kg or less, even more preferably 70 meq/kg or less, and even more preferably 60 meq/kg or less. Here, the acid value of the polyester resin is measured by dissolving a 200 mg sample which is sufficiently dried in 10 ml of heated benzyl alcohol, cooling the solution, thereafter adding 10 ml of chloroform and phenol red, and titrating against a 1/25 N alcoholic potassium hydroxide (potash) (methanol solution of KOH). Also, the hydroxyl value of the polyester resin is calculated by measuring a terminal group concentration, which is the sum of hydroxyl terminal groups and the carboxyl terminal groups of the polyester resin, and subtracting the acid value (carboxyl terminal group concentration) from the found value. The terminal group concentration is measured by binding succinic acid to hydroxyl terminal of the polyester, and obtaining as a total sum of the carboxyl terminal group derived from succinic acid and carboxyl groups owned by the polyester itself (total acid value). The hydroxyl group is calculated by the formula: Hydroxyl value=Total acid value−Acid value.

In addition, the molecular terminal functional group of the polyamide is generally a carboxyl group and an amino group. In the present invention, the existing amount of each of the carboxyl group and the amino group at the molecular terminal of the polyamide usable as the component B in the present invention is not particularly limited, and a general existing amount can be used. In a case where the component B is a polyamide, a terminal amino group concentration is preferably from 10 to 200 μmol/g. More specifically, the terminal amino group concentration is preferably 10 μmol/g or more, more preferably 15 μmol/g or more, even more preferably 20 μmol/g or more, and even more preferably 30 μmol/g or more. In addition, the terminal amino group concentration is preferably 200 μmol/g or less, more preferably 190 μmol/g or less, even more preferably 180 μmol/g or less, and even more preferably 170 μmol/g or less. Here, the terminal amino group concentration and the terminal carboxyl group concentration are obtained from an integral value of property signals corresponding to each of the terminal groups in accordance with $^1$H-NMR.

The monomer units constituting the component C have two embodiments, specifically:

First Embodiment

Monomer units containing 50% by weight or more of monomer units (monomer unit c1) of which SP value is from 17.5 to 25.0, and Second Embodiment Monomer units containing 50% by weight or more of at least one monomer unit selected from the group consisting of (meth)acrylic monomers, styrene, and styrene derivatives (monomer unit c2),
wherein the monomer units c1 and c2 are in common in the point that their affinity with the component A is excellent. Here, First Embodiment and Second Embodiment are differentiated for the sake of convenience, and there are some monomers that are common between the two embodiments. Specifically, (meth)acrylic monomers, styrene, and styrene derivatives, of which SP values are from 17.5 to 25.0 would fall into both the embodiments.

By the reaction of an epoxy group in the component C and a functional group having reactivity with an epoxy group in the component B, a copolymer of the component C and the component B (block form, graft form, star form or a mixture thereof) is formed, whereby the component B can be formed into fine and homogeneous dispersed phase due to the affinity with the component A that forms a continuous phase with the monomer unit c1 or the monomer unit c2 constituting the component C.

In First Embodiment, the SP value for specifying the monomer unit c1 is widely known as Solubility Parameter. The SP value (δ) in the present invention can be obtained by the following estimation formula:
The estimation formula of Van Krevelen
[Van Krevelen] Solubility parameter: δ

$$\delta = (Ecoh/V)^{0.5}$$

$$Ecoh = \Sigma Ecoh, i$$

Units: $(J/cm^3)^{0.5}$
Physical Property Values Necessary for Estimation
V: Molar volume of constitutive repeating units (CRU) [cm$^3$/mol]Physical Amount Calculated by Atomic Group Contribution Method
Ecoh: Molar cohesive energy of Hoftyzer & Van Krevelen [J/mol] Atomic Group Parameter
Ecoh, i: Atomic group parameter for ith molar cohesive energy [J/mol]

The monomer units (numerical value inside the parentheses are SP values) of which SP values are from 17.5 to 25.0 include styrene (18.82), α-methylstyrene (19.55), methyl methacrylate (18.54), n-butyl acrylate (18.12), ethyl acrylate (18.83), methyl acrylate (19.13), methoxyethyl acrylate (19.43), vinyl acetate (19.13), and the like.

Here, for example, an olefin of which SP value is less than 17.5, such as ethylene or propylene, is not appropriate as a main monomer unit of the component C in the present invention. The olefin (numerical value inside the parentheses are SP values) of which SP value is less than 17.5 includes ethylene (16.00), propylene (17.04), and the like.

The SP value of the monomer unit c1 is 17.5 or more, preferably 17.8 or more, and more preferably 18.0 or more, from the viewpoint of the affinity with the component A. In addition, the SP value is 25.0 or less, preferably 23.0 or less, more preferably 22.0 or less, even more preferably 21.0 or less, and even more preferably 20.0 or less. From these viewpoints, the SP value of the monomer unit c1 is from 17.5 to 25.0, preferably from 17.8 to 23.0, more preferably from 18.0 to 22.0, even more preferably from 18.0 to 21.0, and even more preferably from 18.0 to 20.0.

When the proportion of the monomer unit c1 is less than 50% by weight of the monomer units of the component C, its affinity with the component A would be unsatisfactory, so that the component B cannot be excellently dispersed in the component A. The proportion of the monomer unit c1 is more preferably 60% by weight or more, even more preferably 70% by weight or more, and even more preferably 80% by weight or more.

In the present invention, even a monomer unit of which SP value is difficult to be specified can be used as a main monomer component of the component C, so long as the monomer units are (meth)acrylic monomers, styrene, and styrene derivatives.

In view of the above, Second Embodiment of the monomer units of the component C contains at least one monomer unit selected from the group consisting of (meth)acrylic monomers, styrene, and styrene derivatives (monomer unit c2).

Preferred (meth)acrylic monomers as the monomer units c2 are exemplified by methyl (meth)acrylate, ethyl (meth)acrylate, propyl (meth)acrylate, butyl (meth)acrylate, cyclohexyl (meth)acrylate, hydroxyethyl (meth)acrylate, hydroxypropyl (meth)acrylate, glycidyl (meth)acrylate, methoxyethyl (meth)acrylate, ethoxyethyl (meth)acrylate, butoxyethyl (meth)acrylate, phenoxyethyl (meth)acrylate, and the like. Among them, alkyl(1 to 6 carbon atoms) (meth)acrylate esters and glycidyl (meth)acrylate are preferred, from the viewpoint of its affinity with the component A. Hydrogen bond is strong in glycidyl (meth)acrylate or the like, so that it is difficult to specify an SP value therefor, but its affinity with the component A is large, and it is preferred one as the monomer unit c2.

The styrene derivatives mean a compound in which styrene is substituted at an alpha-position, an ortho-position, a meta-position, or a para-position with a substituent such as a lower alkyl group having from 1 to 4 carbon atoms, a lower alkoxy group having from 1 to 4 carbon atoms, a carboxyl group, or a halogen atom. The molecular weight of the substituent (atomic weight) is preferably 60 or less, more preferably 50 or less, and even more preferably 40 or less. Specific examples of the styrene derivative include α-methylstyrene, p-chlorostyrene, and the like.

However, among the monomer units c2, i.e. (meth)acrylic monomers, styrene, and styrene derivatives, of which SP values are specified, those of which SP values are outside the SP values required for the monomer units c1 of First Embodiment, in other words those of which SP values are less than 17.5 and exceeding 25.0 have a low affinity with the component A, so that they are also excluded from the monomer units c2 in Second Embodiment. For example, those monomer units of which SP values are less than 17.5 include alkyl esters of (meth)acrylic monomers having an alkyl group having 8 or more carbon atoms, and the like.

The component C as referred to herein correspond hereinafter to both of the component C of First Embodiment containing the monomer units c1 and the component C of Second Embodiment containing the monomer units c2, unless specified otherwise.

It is preferable that the monomer units constituting the vinyl copolymer (component C) contain a (meth)acrylic monomer in an amount of from 10 to 90% by weight, and styrene or a styrene derivative in an amount of from 10 to 90% by weight. It is more preferable that the monomer units contain a (meth)acrylic monomer in an amount of from 15 to 80% by weight, and even more preferably from 20 to 70% by weight, and that the monomer units contain styrene or a styrene derivative in an amount of from 20 to 85% by weight, and even more preferably from 30 to 80% by weight. Since the component C as described above includes a (meth)acrylic monomer having a large affinity with the component A, and styrene or a styrene derivative having a large affinity with the component B as the constituting units, it is preferred because the component C can effectively function as a compatibilizing agent for both the components A and B.

It is required that the component C is soluble in tetrahydrofuran (THF). The vinyl copolymer not being soluble in THF, for example, acrylic gel, has insufficient affinity with the component A, so that the component B cannot be excellently dispersed in the component A. The phrase "is (being) soluble in THF" means that a solubility in THF at 25° C. is 2% by weight or more. The solubility is more preferably 5% by weight or more, and even more preferably 10% by weight or more.

The component C has 2 or more epoxy groups in one molecule, on average, preferably from 2.5 to 20 epoxy groups, and more preferably from 3 to 10 epoxy groups. When the average number of epoxy groups is less than 2, the reactivity with the component B would be low, so that the component would not function as a compatibilizing agent. Consequently, dispersion stability of the component B is lowered, so that the problems cannot be solved. In other words, a composition that is capable of giving a molded article excellent flexibility and heat resistance, and has a low molding temperature dependence for allowing the molded article to exhibit excellent flexibility and heat resistance cannot be obtained.

The epoxy value of the component C is preferably from 0.5 to 5 meq/g, and more preferably from 0.7 to 3 meq/g, from the viewpoint of its effect as a compatibilizing agent.

Commercially available products that are utilizable as the component C include ARUFON UG Series manufactured by TOAGOSEI CO., LTD., MARPROOF G Series manufactured by NOF CORPORATION, JONCRYL ADR Series manufactured by BASF.

It is required that the component C keeps appropriate affinities with the component A and the component B, and when the weight-average molecular weight of the vinyl copolymer (component C) exceeds 100,000, the dispersibility in and compatibility with the component A is lowered, thereby hampering the dispersion stability of the component B. In addition, when the weight-average molecular weight is less than 1,000, the dispersibility in or compatibility with the component A becomes too high, so that the reaction efficiency with the component B is lowered, whereby consequently hampering the dispersion stability of the component B. From these viewpoints, the weight-average molecular weight of the component C is preferably 1,000 or more, more preferably 3,000 or more, and even more preferably 5,000 or more. In addition, the weight-average molecular weight is preferably 100,000 or less, more preferably 80,000 or less, and even more preferably 60,000 or less. The weight-average molecular weight of the component C is preferably from 1,000 to 100,000, more preferably from 3,000 to 80,000, and even more preferably from 5,000 to 60,000.

The number-average molecular weight of the component C is preferably from 500 to 50,000, more preferably from 1,000 to 40,000, and even more preferably from 2,000 to 30,000, from the viewpoint of the dispersion stability of the component B in the component A, likewise as mentioned above.

The proportions of the component A, the component B and the component C in the composition of the present invention, supposing that a total of the component A and the component B is 100 parts by weight, are as follows.

When the component A is less than 40 parts by weight, the flexibility of the resin composition is hampered. In addition, when the component exceeds 95 parts by weight, an effect of giving heat resistance by the component B cannot be obtained, so that the flow beginning temperature would be low. From these viewpoints, the proportion of the component A is 40 parts by weight or more, preferably 45 parts by weight or more, and more preferably 50 parts by weight or more. In addition, the proportion is 95 parts by weight or less, preferably 90 parts by weight or less, and more preferably 85 parts by weight or less. The proportion of the component A is from 40 to 95 parts by weight, preferably from 45 to 90 parts by weight, and more preferably from 50 to 85 parts by weight.

When the component B is less than 5 parts by weight, the heat resistance of the resin composition is hampered. In addition, when the component exceeds 60 parts by weight, the flexibility of the resin composition is hampered. From these viewpoints, the proportion of the component B is 5 parts by weight or more, preferably 10 parts by weight or more, and more preferably 15 parts by weight or more. In addition, the proportion is 60 parts by weight or less, preferably 55 parts by weight or less, and more preferably 50 parts by weight or less. The proportion of the component B is from 5 to 60 parts by weight, preferably from 10 to 55 parts by weight, and more preferably from 15 to 50 parts by weight.

Here, a total amount of the component A and the component B, of the thermoplastic elastomer composition, is preferably 10.0% by weight or more, more preferably 30.0% by weight or more, even more preferably 50.0% by weight or more, and even more preferably 70.0% by weight or more. In addition, a total amount is preferably 99.9% by weight or less, more preferably 99.0% by weight or less, and even more preferably 98.0% by weight or less. From these viewpoints, a total amount of the component A and the component B is preferably from 10.0 to 99.9% by weight, more preferably from 30.0 to 99.0% by weight, even more preferably from 50.0 to 98.0% by weight, and even more preferably from 70.0 to 98.0% by weight, of the thermoplastic elastomer composition.

When the component C is less than 0.1 parts by weight, the size of the dispersed diameter of the component B greatly changes depending upon the molding temperature conditions, so that rigidity (or flexibility) and flow beginning temperature (heat resistance) of the molded article obtainable by molding the composition would be caused to have some variances. The molded article which is obtainable depending upon the conditions may have worsened heat resistance so that its flow beginning temperature is below 180° C. In addition, when the component exceeds 30 parts by weight, the composition or the molded article would have a worsened balance between flexibility and heat resistance. From these viewpoints, the proportion of the component C is 0.1 parts by weight or more, preferably 0.2 parts by weight or more, and more preferably 0.3 parts by weight or more. In addition, the proportion is 30 parts by weight or less, preferably 20 parts by weight or less, more preferably 15 parts by weight or less, and even more preferably 10 parts by weight or less. The proportion of the component C is from 0.1 to 30 parts by weight, preferably from 0.2 to 20 parts by weight, more preferably from 0.2 to 15 parts by weight, and even preferably from 0.3 to 10 parts by weight. Alternatively, the proportion is preferably from 0.1 to 15 parts by weight, from the viewpoint of moldability during injection-molding.

In the composition of the present invention, when the reaction rate of a functional group of the component B and an epoxy group of the component C is slow, in a case, for example, where a composition of the present invention is produced with an extruder or the like, the extent of reaction is unsatisfactory, so that stability of the dispersed diameter of the component B may be hampered. In view of the above, it is preferable that the composition of the present invention contains a metal salt of an aliphatic carboxylic acid (component D) as a catalyst for accelerating the reaction between a functional group of the component B and an epoxy group of the component C. Because of the addition of the component D, the component B is effectively dispersed, thereby obtaining a composition having more excellent dispersion stability. For example, even when a composition is placed under temperature conditions that would exceed a melting point of the component B, excellent dispersion of the component B can be maintained for a longer period of time. The reasons why the effects as mentioned above are exhibited are assumed to be as follows. A reaction between the component B and the component C would be smooth by the inclusion of the component D, so that the component C more effectively functions as a compatibilizing agent.

The metal salt of an aliphatic carboxylic acid includes metal salts of stearic acid such as sodium stearate, calcium stearate, aluminum stearate, and zinc stearate; and metal salts of 12-hydroxystearic acid such as sodium 12-hydroxystearate and calcium 12-hydroxystearate, and the like.

The content of the metal salt of an aliphatic carboxylic acid (component D), based on 100 parts by weight of a total amount of the component A and the component B, is preferably 0.001 parts by weight or more, and more preferably 0.005 parts by weight or more. In addition, the content is preferably 10 parts by weight or less, and more preferably 5 parts by weight or less. The content of the metal salt of an aliphatic carboxylic acid (component D) is preferably from 0.001 to 10 parts by weight, and more preferably from 0.005 to 5 parts by weight, based on 100 parts by weight of a total amount of the component A and the component B.

It is preferable that the thermoplastic elastomer composition of the present invention further contains a transesterification catalyst (component E). By the addition of the component E, tensile strength at break and the like of the resulting composition are improved. Specifically, in a tensile test, a tensile product, which is a product of strength multiplied by elongation, is large, so that a balance between the strength and the elongation would become more excellent. The reasons why the effects as described above are exhibited are assumed to be as follows. By the inclusion of the component E, the molecular weight of the component A can be made large, and in some cases a partial crosslinking is formed. The component E acts as a crosslinking agent, so that the composition would become even tougher due to the polymerization of the component A, which is the main component of the composition.

As an esterification catalyst used as a reaction catalyst for polymerization and partial crosslinking of the component A, a general polymerization catalyst for polyesters can be used. The catalyst includes, for example, antimony-based catalysts such as antimony trioxide; tin-based catalysts such as butyltins, octyltins, and stannoxanes; titanium-based catalysts such as titanium-based aminates and titanium alkoxides; and zirconium-based catalysts such as zirconium-based acetylacetonates and zirconium alkoxides. Among them, the titanium-based catalysts and the zirconium-based catalysts are preferred, and the titanium-based catalysts are more preferred.

The content of the transesterification catalyst (component E), based on 100 parts by weight of a total amount of the component A and the component B, is preferably 0.01 parts by weight or more, and more preferably 0.1 parts by weight or more. In addition, the content is preferably 10 parts by weight or less, and more preferably 5 parts by weight or less. The content of the transesterification catalyst (component E), based on 100 parts by weight of a total amount of the component A and the component B, is preferably from 0.01 to 10 parts by weight, and more preferably from 0.1 to 5 parts by weight. The content of the transesterification catalyst (component E) is preferably 10 parts by weight or lower, from the viewpoint of inhibiting the lowering of thermoplasticity of the composition obtainable by crosslinking the component A.

The composition of the present invention may contain a radical polymerization initiator (component F), from the viewpoint of the polymerization of the component A.

The radical polymerization initiator includes organic peroxides such as dialkyl peroxides, azo-based compounds such as azobisbutyronitrile, and the like.

The content of the radical polymerization initiator (component F) is preferably from 0.01 to 15 parts by weight, and more preferably from 0.1 to 5 parts by weight, based on 100 parts by weight of a total amount of the component A and the component B.

Any one of the component E and the component F are components included for the purpose of the polymerization of the component A, and either one of the components may be used, or both the components may be used together.

Any one of the component E and the component F are effectively used in a case where the molecular weight of the component A is relatively low. Some cares are needed when the molecular weight of the component A is large, so that the molecular weight of the component A that is polymerized does not become exceedingly large. The component A that is polymerized preferably has a weight-average molecular weight that does not exceed 1,000,000. Loss of its thermoplasticity by crosslinking the component A or the like needs to be avoided.

Further, it is preferable that the composition of the present invention contains a thermal stabilizer, from the viewpoint of inhibiting changes in the properties of the composition of the present invention under heating conditions.

The thermal stabilizer includes phosphorus-containing compounds, hydrazide compounds, organosulfur-based antioxidants, phenol-based antioxidants, amine-based antioxidants, and the like, and compounds that reduces the activity of the catalyst by forming a chelate with other polymerization catalyst for esters (component E), or the like can be utilized. In the present invention, since the resistance against thermal aging of the thermoplastic elastomer is remarkably improved, the phosphorus-containing compounds and the hydrazide compounds are preferred, from the viewpoint of even more increasing the degree of freedom in the operating conditions. These thermal stabilizers may be used in combination. Here, thermal aging involves mainly two phenomena: A first is the lowering of strength caused by an increase in the proportion of the low molecular weight components formed by pyrolysis, and a second is the lowering of elongation caused by formation of crosslinking of active points such as free radicals formed by pyrolysis.

The phosphorus-containing compound includes phosphite-based compounds, polyphosphite-based compounds, phosphate ester-based compounds, polyphosphate-based compounds, and the like.

The phosphite-based compounds include bis(2,6-di-tert-butyl-4-methylphenyl)pentaerythritol diphosphite, triphenyl phosphite, triisodecyl phosphite, tri-2-ethylhexyl phosphite, diphenyl nonylphenyl phosphite, trinonylphenyl phosphite, 9,10-dihydro-9-oxa-10-phosphaphenanthrene-10-oxide, 10-decyloxy-9,10-dihydro-9-oxa-10-phosphaphenanthrene, O-cyclohexyl phosphite, trilauryl trithiophosphite, trioctadecyl phosphite, and the like.

The polyphosphite-based compounds include diisodecyl pentaerythritol diphosphite, distearyl pentaerythritol diphosphite, dinonylphenyl pentaerythritol diphosphite, tetraphenyl dipropylene glycol diphosphite, 4,4'-isobutylidenebis(3-methyl-6-tert-butylphenyl-ditridecyl phosphite), cyclic neopentanetetraylbis(2,6-di-tert-butyl-4-methylphenyl)phosphite (phosphites having pentaerythritol backbone structures), and the like.

The phosphate ester-based compounds include trimethyl phosphate, triethyl phosphate, dibutyl phosphate, tributyl phosphate, dioctyl phosphate, trioctyl phosphate, and a phosphate ester compound represented by the formula (I):

$$O=P(\!+\!OR^1\!\!\rightarrow\!_m OH)_3 \quad (I)$$

wherein $R^1$ is an alkylene group having from 1 to 10 carbon atoms, and m is an integer of from 1 to 10,
a phosphate ester compound represented by the formula (II):

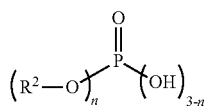

(II)

wherein $R^2$ is an alkyl group having from 1 to 20 carbon atoms; and
n is 1 or 2,
and the like.

The phosphate ester compound represented by the formula (I) includes tri(hydroxyethoxy)phosphate, tri(hydroxyethoxyethoxy)phosphate, and the like.

The phosphate ester compound represented by the formula (II) include mono-stearyl acid phosphate, di-stearyl acid phosphate, and the like.

The hydrazide compound is an acid hydrazide prepared by condensing an acid and hydrazine, which includes acyclic hydrazides, cyclic hydrazides, and the like.

The acyclic hydrazides include compounds represented by the formula (IIIa) or (IIIb):

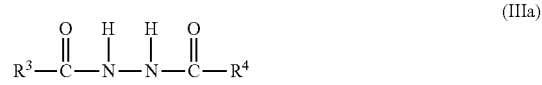

(IIIa)

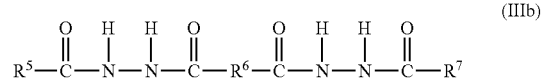

(IIIb)

wherein each of $R^3$, $R^4$, $R^5$ and $R^7$ is independently an aromatic monocarboxylic acid residue, and $R^6$ is an aliphatic dicarboxylic acid residue or an aromatic dicarboxylic acid residue.

The aromatic monocarboxylic acid residue represented by $R^3$, $R^4$, $R^5$, and $R^7$ includes residues of aromatic carboxylic acids such as benzoic acid, 4-butylbenzoic acid, salicylic acid, naphthyl acid compounds, 3-(3,5-di-t-butyl-4-hydroxyphenyl)propionic acid, and phenoxypropionic acid. The aliphatic dicarboxylic acid residue represented by $R^6$ includes residues of aliphatic dicarboxylic acids having from 2 to 20 carbon atoms, such as succinic acid, adipic acid, azelaic acid, sebacic acid, and dodecane diacid. The aromatic dicarboxylic acid residues include residues of aromatic dicarboxylic acids such as phthalic acid, isophthalic acid, and terephthalic acid.

The cyclic hydrazide includes a compound represented by the formula (IV):

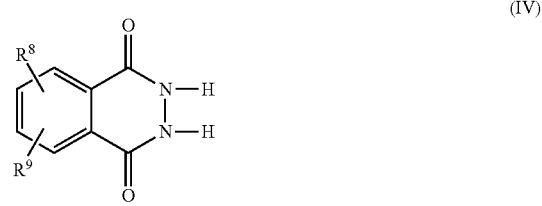

(IV)

wherein $R^8$ and $R^9$ is a hydrogen atom, a halogen atom, a hydroxy group, or an alkyl group, an alkenyl group, an alkynyl group, an alkoxy group, a cycloalkyl group, or an aryl group having from 1 to 18 carbon atoms, and the like.

Specific examples of the compound represented by the formula (IV) include phthalhydrazide, and the like.

When the radical polymerization initiator (component F) is used as an agent for polymerizing the (meth)acrylic elastomer, a radical scavenger or a radical polymerization inhibitor is also effective as a thermal stabilizer.

The content of the thermal stabilizer is preferably from 0.01 to 15 parts by weight, and more preferably from 0.05 to 10 parts by weight, based on 100 parts by weight of a total amount of the component A and the component B.

Other additives include heavy metal-deactivating agents and lubricants such as fatty acid esters; photo-stabilizers such as benzotriazole-based compounds, benzophenone-based compounds, benzoate compounds, and hindered phenol-based compounds; hydrolysis inhibitors such as carbodiimide compounds and oxazoline compounds; plasticizers such as phthalate ester-based compounds, polyester compounds, (meth)acrylic oligomers, and process oils; inorganic foaming agents such as sodium bicarbonate and ammonium bicarbonate; organic foaming agents such as nitro compounds, azo compounds, and sulfonyl hydrazide; fillers such as carbon black, calcium carbonate, talc, and glass fibers; flame retardants such as tetrabromophenol, ammonium polyphosphate, melamine cyanurate, magnesium hydroxide, and aluminum hydroxide; compatibilizing agents such as silane-based coupling agents, titanate-based coupling agents, aluminate-based coupling agent, and acid-modified polyolefin resins; and other pigments and dyes, and the like.

It is preferable that the thermoplastic elastomer composition of the present invention is obtained by a method including thermally kneading raw material components at least containing a (meth)acrylic elastomer (component A), a thermoplastic resin (component B) and a vinyl copolymer (component C), and further optionally a metal salt of an aliphatic carboxylic acid (component D), an esterification catalyst (component E), a radical polymerization initiator (component F), and the like with an extruder or a kneader.

When the (meth)acrylic elastomer (component A) is tried to be polymerized, using an esterification catalyst (component E) or a radical polymerization initiator (component F), it is preferable that the properties of the composition are more stabilized by a combined use with a thermal stabilizer. The timing of addition of a thermal stabilizer is preferably after the component A is polymerized, for example, at a kneading temperature of from 180° to 350° C., after the raw materials other than the thermal stabilizer are kneaded for 0.5 to 30 minutes or so. When the timing of addition of a thermal stabilizer is too early, the polymerization of the component A may be unsatisfactory in some cases.

The temperature of the thermal kneading is such that when the temperature is lower than a melting point of the component B, the component B cannot be finely dispersed, and whereby consequently the heat resistance of the resulting composition becomes insufficient. In addition, when the temperature exceeds 350° C., the (meth)acrylic component of the component A undergoes pyrolysis, so that the mechanical properties of the resulting composition are lowered. From these viewpoints, a preferred temperature for thermal kneading is a temperature equal to or higher than a melting point of the component B and equal to lower than 350° C. A more preferred temperature for thermal kneading is a temperature of (a melting point of the component B+10° C.), and an even more preferred lower limit temperature is (melting point of the component B+20° C.). A more preferred upper limit temperature for thermal kneading is 320° C., and an even more preferred upper limit temperature is 300° C.

The extruder includes, for example, single-screw extruders, parallel screw twin-screw extruders, conical screw twin-extruders, and the like. In the present invention, the twin-screw extruders are preferred, and co-rotating twin-screw extruders are even more preferred, from the viewpoint of having excellent blending ability, i.e. the mixture obtained having excellent dispersibility.

As the die mounted on a discharge part of the extruder, any given ones can be selected. For example, the die includes strand dies suitable in the production of pellets, T dies suitable in the production of sheets and films, and other pipe dies, profile extrusion dies, and the like.

In addition, the extruder may be provided with vents for degassing communicated with an air opening part or a pressure-reducing device, or may be provided with plural raw material supply inlets.

The kneader means a batch-style mixer that is temperature-controllable, and includes a Banbury mixer, Brabender, and the like.

Each of the components may be supplied to an extruder or a kneader at one time or separately, or each may be supplied in divided portions. However, the supply of the thermal stabilizer is as mentioned above.

The thermal kneading time cannot be unconditionally determined because the thermal kneading time depends on the heating temperature, the kinds and concentrations of each of the components, and the like. It is preferable that the thermal kneading time is appropriately determined taking the control of variance in the qualities and productivity of the resulting thermoplastic elastomer composition into consideration. A representative thermal mixing time when using an extruder is, for example, from 0.5 to 20 minutes, preferably from 0.7 to 15 minutes, and more preferably from 1 to 10 minutes.

The thermoplastic elastomer composition of the present invention thus obtained has a phase separation structure comprising a continuous phase and a dispersed phase. The continuous phase contains a component derived from the (meth)acrylic elastomer (component A), and the dispersed phase contains a component derived from the thermoplastic resin (component B). In the thermoplastic elastomer composition of the present invention, the dispersed phase is finely dispersed in the continuous phase, which can give a molded article excellent flexibility and heat resistance, and has a low molding temperature dependence for the molded article to exhibit excellent flexibility and heat resistance, i.e. a wider allowable molding temperature, and smaller limitations in the molding conditions in the processing into a molded article.

Specifically, even when heated and molded at a temperature at which sufficient flowability is obtained for molding (temperature H described later), some effects are exhibited that flexibility and heat resistance do not undergo significant changes, in particular heat resistance is hardly lowered, as compared to a case when heated and molded at a temperature that allows the component A forming a continuous phase to flow but does not allow the component B forming a dispersed phase to melt (temperature L described later).

As to the flow beginning temperature of the thermoplastic elastomer composition of the present invention, its lower limit is 180° C., from the viewpoint of heat resistance, and its upper limit is 350° C., from the viewpoint of processability. In other words, the flow beginning temperature is from 180° to 350° C., preferably from 190° to 320° C., and more preferably from 200° to 300° C.

When the prepared composition is in a shape that cannot be used as a sample for directly measuring a flow beginning temperature, as in pellets, powders, irregular shaped lumpy masses, or the like, a sheet-like molded article is prepared by hot press for a short time period (5 minutes) at a temperature in the vicinity (±5° C.) of a temperature that is lower than a melting point of the thermoplastic resin (component B) by 20° C., to obtain a sample for measuring physical property values for the composition. Even when a heat history is applied at such a low temperature for a short time period, the physical property values of the composition of the present invention do not undergo significant changes, so that the above-mentioned physical property values of the molded articles can be regarded as the physical property values of the compositions. Not only the flow beginning temperature, but also A hardness, particle sizes, and the like will be handled similarly. Upon obtaining a sample for measuring the physical property values of the composition with hot press, samples free from bubbles and the like are more likely to be obtained when the composition is prepared in the form of lumpy masses.

It is preferable that a molded article is obtainable by heating a thermoplastic elastomer composition of the present invention for 5 minutes with a hot press machine set at two kinds of temperatures, namely a temperature L, which is within a range of [((melting point of the component B)−20° C.)±5° C.] or
a temperature H, which is within a range of [((melting point of the component B)+10° C.)±5° C.],
wherein the molded article is obtained at any one of the temperatures,
wherein the molded article comprises a phase separation structure comprising a continuous phase and a dispersed phase. In addition, as to the molded article at any one of temperatures, a maximum particle size of the dispersed phase as observed with an electron microscope is preferably 5 μm or less, more preferably 3 μm or less, and even more preferably 2 μm or less, from the viewpoint of heat resistance of the molded article. Here, in the present invention, the diameter of the dispersed phase is a diameter in a case of a truly circular form, or a length in a case of an oval form.

Hereinafter, a molded article obtainable by heating for 5 minutes with a hot press machine set at a temperature L, which is within a range of [((melting point of the component B)−20° C.)±5° C.], is referred to as a molded article L, and a molded article obtainable by heating for 5 minutes with a hot press machine set at a temperature H, which is within a range of [((melting point of the component B)+10° C.)±5° C.], is referred to as a molded article H.

In the molded article L and the molded article H, a ratio of the average particle sizes of the dispersed phase observed with an electron microscope is preferably 0.6 or more, more preferably from 0.6 to 1.3, and even more preferably from 0.7 to 1.2, wherein the ratio is an average particle size of a molded article L/an average particle size of a molded article H, from the viewpoint of having lower molding temperature dependence (wider allowable range of molding temperatures) for exhibiting excellent flexibility and heat resistance in the molded article obtainable by molding the composition.

The composition so as to have A hardness of the molded article L and the molded article H of both from 20 to 90, and more preferably from 30 to 85 is a preferred composition as a thermoplastic elastomer composition of the present invention.

As to the molded article L and the molded article H, the composition so as to have a ratio of A hardness of from 0.6 to 1.3, more preferably from 0.7 to 1.25, and even more preferably from 0.8 to 1.2, wherein the ratio is A hardness of the molded article L/A hardness of the molded article H, is a preferred composition as a thermoplastic elastomer composition of the present invention.

The composition so as to have a flow beginning temperature of from 180° to 350° C., more preferably from 190° to 320° C., and even more preferably from 200° to 300° C., is a preferred composition as a thermoplastic elastomer composition of the present invention.

Especially, the flow beginning temperatures of the molded article L and the molded article H are both from 180° to 350° C., more preferably from 190° to 320° C., and even more preferably from 200° to 300° C., is a preferred composition as a thermoplastic elastomer composition of the present invention.

The composition so as to have a tensile elongation at break of the molded article H of 100% or more, preferably from 150 to 1,000%, and even more preferably from 200 to 800%, is a preferred composition as a thermoplastic elastomer composition of the present invention.

The thermoplastic elastomer composition of the present invention has particularly excellent heat resistance and chemical resistance, and in the fields of thermoplastic elastomer materials, the thermoplastic elastomer composition can be used in the same application fields as in the thermoplastic polyester-based elastomers and thermoplastic polyamide-based elastomers.

The applications of the thermoplastic elastomer composition of the present invention include, for example, the followings:

[Boot Covers and Engine-Related Hose Covers in the Fields of Automobiles]

Automotive Body Parts

Door handle latch, control cable cover, boots, emblems, chassis and steering parts, fuel hose Boots for constant velocity joint, rack and pinion boots, strut suspension boots, ball joint bushes, dust seal, brake hose Engine Parts Air duct hose, air duct, air intake hose, vacuum hose for engine control, intercooler hose, fuel line cover, various vibration proofed materials and damping materials, radiator hose, heater hose, oil cooler hose, power steering hose, various gaskets, various covers and cases, such as engine underhood and engine room cover

[Coating Materials for Electric Wires and Cables]

Electric Wires for Electronic and Public Welfare Equipment

Electric wire coatings for computers and office automation (OA) machines, television, videotape recorder (VTR), etc.

Communication Cables

Coating materials for communication electric wires and optical fibers

Insulation Electric Wires, Communication Cables, Electric Wires for Machines, Automotive Wire Harness

[Industrial Articles Including Hose, Tube, Belt, Sound-Proof, Vibration-Proof Sheets, and the Like]

Air hose or hydraulic hose (tube), high-pressure hose (tube), fuel hose (tube), conveyor belt, V or round belt, timing belt, cushion grip, flex hammer, sound-proof gear, flexible coupling, gasoline tank sheet, gasket, packing, sealant, O ring, diaphragm, curl cord, accumulator interior, conveyor roller, compression spring, mandrel, towrope jacket

[Sports Articles]

Outermost Skin of Golf Balls, Ski Cuff Boots and Hiking Cuff Boots, Soles of Running Shoes A molded article is obtained by appropriately thermally molding a thermoplastic elastomer composition of the present invention in accordance with a conventional method. The applications of the molded article obtainable by thermally molding a thermoplastic elastomer of the present invention are not particularly limited, and can be used in the fields in which general styrene-based elastomers, polyolefin-based elastomers, polyurethane-based elastomers, polyamide-based elastomers, acrylic elastomers, polyester-based elastomers, and the like can be used.

Since the molded article obtainable by molding a thermoplastic elastomer composition of the present invention has excellent heat resistance, the molded article can be suitably used even for applications in need of heat resistance of, for example, 100° C. or higher (or 120° C. or higher, 150° C. or higher, etc. depending upon the design).

The temperature during thermal molding is preferably 180° C. or higher, from the viewpoint of flowability of the composition and molding processability caused thereby, and the temperature is preferably 350° C. or lower, from the viewpoint of preventing pyrolysis of the (meth)acrylic component (component A), in the composition. From these viewpoints, the temperature during thermal molding is preferably from 180° to 350° C., and more preferably from 200° to 320° C.

As the apparatus usable in the production of the molded article using a thermoplastic elastomer composition of the present invention, any molding machines that are capable of melt-molding the composition can be used. For example, the apparatus includes kneaders, extrusion molding machines, injection molding machines, press molding machines, blow molding machines, mixing rollers, and the like.

The molded article of the present invention is obtainable by thermally molding a thermoplastic elastomer composition mentioned above at a temperature of from 180° to 350° C., and a molded article of which flow beginning temperature which serves as an index for heat resistance of from 180° to 350° C. is preferred, a molded article of which flow beginning temperature is from 190° to 320° C. is more preferred, and a molded article of which flow beginning temperature is from 200° to 300° C. is even more preferred. When the flow beginning temperature is lower than 180° C., the molded article may have insufficient heat resistance in some cases. Although the upper limit of the flow beginning temperature of the molded article is not particularly limited, it would be less likely to obtain a molded article of which flow beginning temperature exceeds 350° C. from the composition of the present invention.

The molded article of the present invention is obtained by thermally molding a thermoplastic elastomer composition mentioned above at a temperature of from 180° to 350° C., and the tensile elongation at break of the molded article, as a fundamental property required for the elastomer, is preferably 100% or more, more preferably from 150 to 1,000%, and even more preferably from 200 to 800%. Similarly, the tensile strength at break is preferably from 2 to 20 MPa, and more preferably from 4 to 15 MPa.

The molded article of the present invention is obtained by thermally molding a thermoplastic elastomer composition mentioned above at a temperature of from 180° to 350° C., and the A hardness of the molded article, which serves as an index for flexibility is preferably from 20 to 90, and more preferably from 30 to 85. When the A hardness of the molded article exceeds 90, the molded article may be insufficient in flexibility in some cases. Although there is no lower limit of the A hardness of the molded article, the molded article obtainable by molding a thermoplastic elastomer composition of the present invention is less likely to have A hardness of less than 20.

EXAMPLES

The present invention will be specifically described hereinbelow by the Examples, without intending to limit the scope of the present invention thereto.

[Production of Copolymer C3]

An oil jacket temperature of a 1-liter high-pressure agitation tank reactor equipped with an oil jacket was held at 200° C. On the other hand, a raw material tank was charged with a liquid monomer mixture composed of 74 parts by weight of styrene, 20 parts by weight of glycidyl methacrylate, 6 parts by weight of n-butyl acrylate, 15 parts by weight of xylene, and 0.5 parts by weight of a polymerization initiator di-tert-butyl peroxide (DTBP). The liquid monomer mixture was continuously supplied to the reactor from the raw material tank at a constant supplying rate (48 g/minute, residence time: 12 minutes), and the liquid reaction mixture was continuously drawn out from an outlet of the reactor so that a content liquid weight of the reactor is constant at about 580 g. The internal temperature of the reactor at this time was held at about 210° C.

After 36 minutes passed from stabilization of the internal temperature of the reactor, the liquid reaction mixture that was drawn out was continuously subjected to a volatile component removal treatment with a thin film evaporator held at a reduced pressure of 30 kPa and a temperature of 250° C., thereby collecting Copolymer C3 hardly containing any volatile components. About 7 kg of the copolymer C3 was collected over 180 minutes.

[Production of Copolymers C1 and C2 and Comparative Copolymer C'5]

Copolymers C1 and C2 and Comparative Copolymer C'5 were produced in the same manner as in Copolymer C3, except that a liquid monomer mixture composed of the monomers having components as listed in Table 3-1, 15 parts by weight of xylene, and 0.3 parts by weight of DTBP was used.

Examples 1 to 30 and Comparative Examples 1 to 10

A batch-type kneader (manufactured by Brabender, Plastograph Model EC50) heated to 260° C. was charged with raw material components in compositional ratios (parts by weight) as listed in Tables 6 to 9 in a total amount of 54 g, and the raw materials were melt-kneaded at a rotational speed of 60 r/m. At a kneading time of 10 minutes, an entire amount of the kneaded mixture in a molten state was taken out, and cooled at room temperature, to give a composition.

The details of the resin raw materials used are as listed in Tables 1 to 5.

TABLE 1

Component A ((Meth)acrylic Elastomer) and Comparative Component A'

| | Name | Manufacturer, etc. | Mw | Structure[1] and Composition | A Hardness | Flow Beginning Temperature |
|---|---|---|---|---|---|---|
| A1 | KURARITY, LA-2330 | manufactured by KURARAY CO., LTD., acrylic elastomer | 140,000 | PMMA-PBA-PMMA Triblock 10-80-10 (% by wt.) | 30 | 150° C. |
| A2 | KURARITY, LA-2250 | manufactured by KURARAY CO., LTD., acrylic elastomer | 80,000 | PMMA-PBA-PMMA Triblock 15-70-15 (% by wt.) | 65 | 173° C. |

TABLE 1-continued

Component A ((Meth)acrylic Elastomer) and Comparative Component A'

|  | Name | Manufacturer, etc. | Mw | Structure[1] and Composition | A Hardness | Flow Beginning Temperature |
|---|---|---|---|---|---|---|
| A3 | LA-2550 | manufactured by KURARAY CO., LTD., acrylic elastomer | 120,000 | PMMA-PBA-PMMA Triblock 15-70-15 (% by wt.) | 65 | 175° C. |
| A'1[2] | Nipol, AR-54 | manufactured by ZEON CORPORATION, acrylic rubber | Solvent - Insoluble, Undeterminable | BA/EA/MEA = 52/6/42 | — | — |

[1]PMMA: Hard segment block, Tg 107° C. (Literature value according to DSC measurement) PBA: Soft segment block, Tg −54° C. (Literature value according to DSC measurement)
[2]Identical substance as C'3

TABLE 2

Component B (Thermoplastic Resin) and Comparative Component B'

|  | Name | Manufacturer etc. | Melting Point | Melt Viscosity Measurement Temp. (melting point +15 ± 2° C.) | Melt Viscosity Shearing Rate 1216 sec$^{-1}$ |
|---|---|---|---|---|---|
| B1 | TORAYCON, 1401-X04 | manufactured by TORAY INDUSTRIES, LTD. Polybutylene terephthalate | 223° C. | 240° C. (melting point: 223° C.) | 488 Pa · s |
| B2 | TORAYCON, 1401-X06 | manufactured by TORAY INDUSTRIES, LTD. Polybutylene terephthalate | 223° C. | 240° C. (melting point: 223° C.) | 325 Pa · s |
| B3 | A1030BRL | manufactured by UNITIKA LTD., Nylon 6 | 225° C. | 240° C. (melting point: 225° C.) | 542 Pa · s |
| B4 | SA-1206 | manufactured by UNITIKA LTD., Polyethylene terephthalate | 255° C. | 270° C. (melting point: 255° C.) | 155 Pa · s |
| B5 | MA-2101 | manufactured by UNITIKA LTD., Polyethylene terephthalate | 255° C. | 270° C. (melting point: 255° C.) | 1,134 Pa · s |
| B6 | SA-1346P | manufactured by UNITIKA LTD., Polyester Copolymer | 230° C. | 245° C. (melting point: 230° C.) | 154 Pa · s |
| B7 | MA-1340P | manufactured by UNITIKA LTD., Polyester Copolymer | 230° C. | 245° C. (melting point: 230° C.) | 91 Pa · s |
| B8 | LEONA 9400S | manufactured by Asahi Kasei Chemicals Corporation, Nylon 66 | 265° C. | 240° C. (melting point: 225° C.) | 488 Pa · s |
| B'1 | XAREC S105 | manufactured by Idemitsu Kosan Co., Ltd., Syndiotactic Polystyrene | 270° C. | 240° C. (melting point: 225° C.) | 325 Pa · s |

TABLE 3-1

Component C (Vinyl Copolymer Having Epoxy Groups) and Comparative Component C'

|  | Name | Manufacturer etc. | Mn | Mw | Epoxy Value (meq/g) | Copolymer Composition (% by wt.) | State | Average Number of Epoxy Groups Per One Molecule |
|---|---|---|---|---|---|---|---|---|
| C1 | Copolymer C1 | Home made, acrylic copolymer | 2,900 | 9,900 | 2.1 | GMA/St/MMA = 30/69/1 | Solid | 6.1 |

TABLE 3-1-continued

Component C (Vinyl Copolymer Having Epoxy Groups) and Comparative Component C'

| Name | | Manufacturer etc. | Mn | Mw | Epoxy Value (meq/g) | Copolymer Composition (% by wt.) | State | Average Number of Epoxy Groups Per One Molecule |
|---|---|---|---|---|---|---|---|---|
| C2 | Copolymer C2 | Home made, acrylic copolymer | 2,900 | 10,800 | 1.7 | GMA/St/BA/MMA = 25/38/8/29 | Solid | 5.1 |
| C3 | Copolymer C3 | Home made, acrylic copolymer | 3,800 | 9,800 | 1.4 | GMA/St/BA = 20/74/6 | Solid | 5.3 |

TABLE 3-2

| | | | Copolymer Composition (% by mol) | | | | |
|---|---|---|---|---|---|---|---|
| Name | | Manufacturer etc. | Et | MA | AA | Mn | Mw |
| C'4 | Vamac G | manufactured by Dupont K.K., ethylene acrylic rubber | 70 | 29.2 | 0.8 | 33,400 | 261,700 |

TABLE 3-3

| | | | Copolymer Composition (% by mol) | | | |
|---|---|---|---|---|---|---|
| Name | | Manufacturer etc. | Et | MA | GMA | VA |
| C'1 | BONDFAST 2B | manufactured by Sumitomo Chemical Co., Ltd., ethylene-GMA copolymer | 83 | — | 12 | 5 |
| C'2 | BONDFAST 7M | manufactured by Sumitomo Chemical Co., Ltd., ethylene-GMA copolymer | 67 | 27 | 6 | — |

TABLE 3-4

| | Name | Manufacturer etc. | BA | EA | MEA | Mw |
|---|---|---|---|---|---|---|
| C'3* | Nipol AR-54 | manufactured by ZEON CORPORATION, acrylic rubber | 52 | 6 | 42 | Solvent Insoluble, Undeterminable |

*Identical substance as A'1

TABLE 4-1

Component D (Metal Salt of Aliphatic Carboxylic Acid)

| | Name | Manufacturer etc. |
|---|---|---|
| D1 | SC-100 | manufactured by Sakai Chemical Industry Co., Ltd., Calcium Stearate |
| D2 | SZ-2000 | manufactured by Sakai Chemical Industry Co., Ltd., Zinc Stearate |

TABLE 4-2

Component E (Transesterification Catalyst)

| | Name | Manufacturer etc. |
|---|---|---|
| E1 | ORGATIX TC-400 | manufactured by Matsumoto Fine Chemical Co., Ltd., titanium-based aminate |
| E2 | ORGATIX TZ-150 | manufactured by Matsumoto Fine Chemical Co., Ltd., zirconium-based acetyl acetonate |

TABLE 4-3

Other Components

| | Name | Manufacturer etc. |
|---|---|---|
| Phosphorus-Containing Thermal Stabilizer | PEP-36 | manufactured by ADEKA CORPORATION, bis(2,6-di-tert-butyl-4-methylphenyl)pentaerythritol diphosphite |
| Phenol-Based Thermal Stabilizer | Irganox 1010 | manufactured by BASF Japan, Ltd., pentaerythritoltetrakis[3-(3,5-di-tert-butyl-4-hydroxyphenyl)propionate |
| Sulfur-Containing Thermal Stabilizer | SUMILIZER TPL-R | manufactured by Sumitomo Chemicals Co., Ltd., dilauryl 3,3'-thiopropionate |
| Heavy Metal Deactivating Agent | ADK STAB CDA-6 | manufactured by ADEKA CORPORATION, disalitiloyl-decamethylenecarboxylic acid hydrazide |
| Phosphorus-Containing Thermal Stabilizer | Irgafos 168 | manufactured by BASF Japan, Ltd., tris(2,4-di-tert-burylphenyl) phosphite |
| Mixed Thermal Stabilizer | Irganox B-225 | manufactured by BASF Japan, Ltd., Equivolume Mixture of Irganox 1010 and Irgafos 168 |

TABLE 5

| Abbreviations | Name |
|---|---|
| P(*) | Poly(*) |
| St | Styrene |
| GMA | Glycidyl methacrylate |
| MMA | Methyl methacrylate |
| BA | n-Butyl acrylate |
| EA | Ethyl acrylate |
| MA | Methyl acrylate |
| MEA | Methoxyethyl acrylate |
| AA | Acrylic acid |
| VA | Vinyl acetate |
| Et | Ethylene |

Here, the physical properties of each of the raw material components listed in Tables 1 to 4 were measured in accordance with the following methods. The preparation of the sheet of the raw materials was carried out in the same manner as in the preparation of the pressed sheet of the composition described later. However, the press temperature was adjusted depending upon the raw materials (a temperature at which flow is visually recognized by previously heating a small amount of raw materials was grasped).

[A Hardness]

A pressed sheet is allowed to stand in a thermohygrostat (temperature: 23° C., relative humidity: 50%) for 24 hours or more to stabilize the state of the pressed sheet.

Three pieces of pressed sheets having a thickness of 2 mm are overlaid, and the measurement is taken as prescribed in JIS K7215 "Durometer Hardness Test Method of Plastics."

[Flow Beginning Temperature]

Rectangular strip test pieces having dimensions of a width of 12 mm×a length of 30 mm were cut out from the pressed sheets, and viscoelastic properties of each sample are measured with a dynamic viscoelasticity measurement instrument (TA Instruments, Model RSA-II) with settings of a torsion mode (10 gf load), a frequency of 10 Hz, a heating rate of 5° C./min, and temperatures of from 0° to 280° C.

The inflection point of the storage modulus obtained, or a temperature that would be undeterminable is defined as a flow beginning temperature. Here, although an inflection point of the storage modulus also appears near a glass transition temperature, no flow takes place, so that this point does not correspond to the flow beginning temperature.

[Melting Point]

About 10 mg sample was placed in an aluminum pan, and an aluminum lid was pressure-fixed to the aluminum pan. The aluminum pan is placed in a device measuring section of a differential scanning calorimeter (PerkinElmer, DSC 8000) under the conditions of in the air and a heating rate of 20° C./minute.

[Melt Viscosity (JIS K7199, ISO 11443)]

A thermoplastic resin as listed in Table 2 is dried in a dryer set at 120° C. for 4 hours.

Using a capillary rheometer (manufactured by TOYO SEIKI SEISAKU-SHO, LTD., Capillograph 1D) having a capillary die having dimensions of an inner diameter of 1 mm×a length of 10 mm, a cylinder having a temperature setting of 240° C. is charged with the sample piece dried, and allowed to reside for 5 minutes from the completion of charging, and thereafter a melt viscosity of the sample piece is measured under the condition of a shearing rate of 1,216 sec$^{-1}$.

[Weight-Average Molecular Weight (Mw) and Number-Average Molecular Weight (Mn)]

According to gel permeation chromatograph (hereinafter also referred to as GPC), the molecular weights are obtained as calculated from polystyrene, using THF as a solvent.

[Average Number of Epoxy Groups per One Molecule (Fn)]

It is calculated from the following formula.

Average Number of Epoxy Groups$(Fn)=a \times b/100c$,

In the above-mentioned formula, each of a, b and c is as follows:
a: a proportion of vinyl monomer units having epoxy groups contained in the copolymer (% by weight),
b: a number-average molecular weight of the copolymer, and
c: a molecular weight of vinyl monomers having epoxy groups.

[Epoxy Value]

The number of milli-equivalence of the epoxy groups contained in a 1 g sample (the number of equivalence of the epoxy groups contained in a 1 kg sample), which corresponds to an epoxy index as prescribed in JIS K7236.

A composition obtained in each of Examples and Comparative Examples is subjected to hot press for 5 minutes with a hot press machine heated to 200° C. or 230° C. (manufactured by Toho K.K., 50 t-hot press) using a mold frame having dimensions of a thickness of 2 mm×10 cm×10 cm, and thereafter subjected to a cool press for 5 minutes, to prepare two kinds of the pressed sheets having different heating conditions, namely a pressed sheet at 200° C. (200° C. pressed sheet) and a pressed sheet at 230° C. (230° C. pressed sheet).

Here, the flow beginning temperatures of the compositions of Examples described later are from 208° to 231° C., and the pressed sheet molding temperature (200° C.) for measuring the physical properties of the composition is lower than the flow beginning temperature, but the composition flows to an extent that a sheet-like molded article can be obtained by hot press, clearly without defects such as gas bubbles.

Here, exception was only made on the composition of Comparative Example 6 where the above-mentioned heating conditions (at 200° C. or 230° C.) were changed to 250° C. or 280° C.

As to Examples and Comparative Examples other than Comparative Example 6, 200° C. is a temperature corresponding to a temperature L, which is within a range of [((melting point of the component B)−20° C.)±5° C.], and 230° C. is a temperature corresponding to a temperature H, which is within a range of [((melting point of the component B)+10° C.)±5° C.].

As to Comparative Example 6, 250° C. is a temperature corresponding to a temperature L, which is within a range of [((melting point of the component B)−20° C.)±5° C.], and 280° C. is a temperature corresponding to a temperature H, which is within a range of [((melting point of the component B)+10° C.)±5° C.].

Using the pressed sheets, the A hardness, the average particle size of the dispersed phase, the maximum particle size, the tensile strength and the flow beginning temperature were measured and evaluated. The results are shown in Tables 6 to 9.

The pressed sheets obtained by subjection to hot press at any one of the temperatures of a temperature L and a temperature H fall under to the molded articles of the present invention, and the physical property values of the pressed sheets obtainable by subjection to hot press at a temperature L, as mentioned above, are considered to correspond to the physical property values of the thermoplastic elastomer composition of the present invention.

[A Hardness]

A pressed sheet is allowed to stand in a thermohygrostat (temperature: 23° C., relative humidity: 50%) for 24 hours or more to stabilize the state of the pressed sheet.

Three pieces of pressed sheets having a thickness of 2 mm are overlaid, and the measurement is taken as prescribed in JIS K7215 "Durometer Hardness Test Method of Plastics."

[Average Particle Size of Dispersed Phase and Maximum Particle Size]

A pressed sheet is cut with a cutter knife, and a cross section thereof is photographed with the surface magnified from 1,000 to 5,000 times using a scanning electron microscope (manufactured by KEYENCE CORPORATION, electron microscope VB-9800).

With respect to the photographs obtained, particle sizes of a total of ten large and small observable particles are measured using an image analyzing software "Image J," to calculate an average particle size. In addition, a particle size of the largest particle among the observable particles is measured.

In the measurement, when particles are not easily recognizable, a more vivid image may be obtained by treating the surface of the sample with a solvent A or a solvent B, and is a preferred method, wherein the solvent A easily dissolves the component A but hardly dissolves the component B, and the solvent B hardly dissolves the component A but easily dissolves the component B. If the treatment conditions with a solvent A are adjusted, the component A that forms a continuous phase is eroded, thereby making more distinct the presence of the component B, which is a dispersed phase (dispersed particles). Nearly all of the component A that forms a continuous phase are dissolved, so that the particle sizes of the particles composed of the component B that is released in a dispersed state in the solution can be also measured. Also, conversely, if the treatment conditions with a solvent B are adjusted, the component B, that is a dispersed phase (dispersed particles), is eroded, thereby making more distinct the presence of a dent which is assumed to be the particle sizes of the dispersed particles.

The solvent A or the solvent B as described above can be selected by previously checking its solubility in a representative solvent for the raw materials the component A and the component B. Examples of the solvent A include acetone, methanol and the like.

Figure 2:
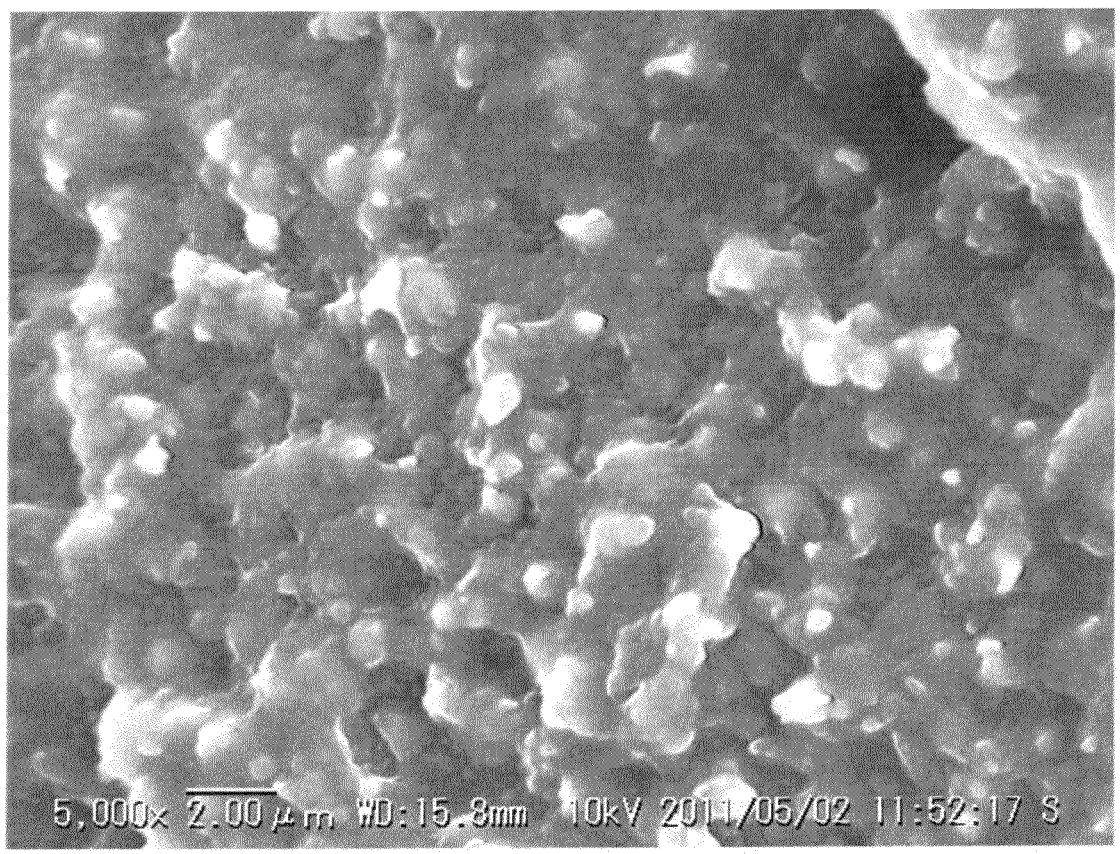
FIG. 2 is a photograph of a scanning electron microscope of a cross section of a pressed sheet at 230° C. obtained from the composition of Example 1 (5,000 folds).
Figure 3:
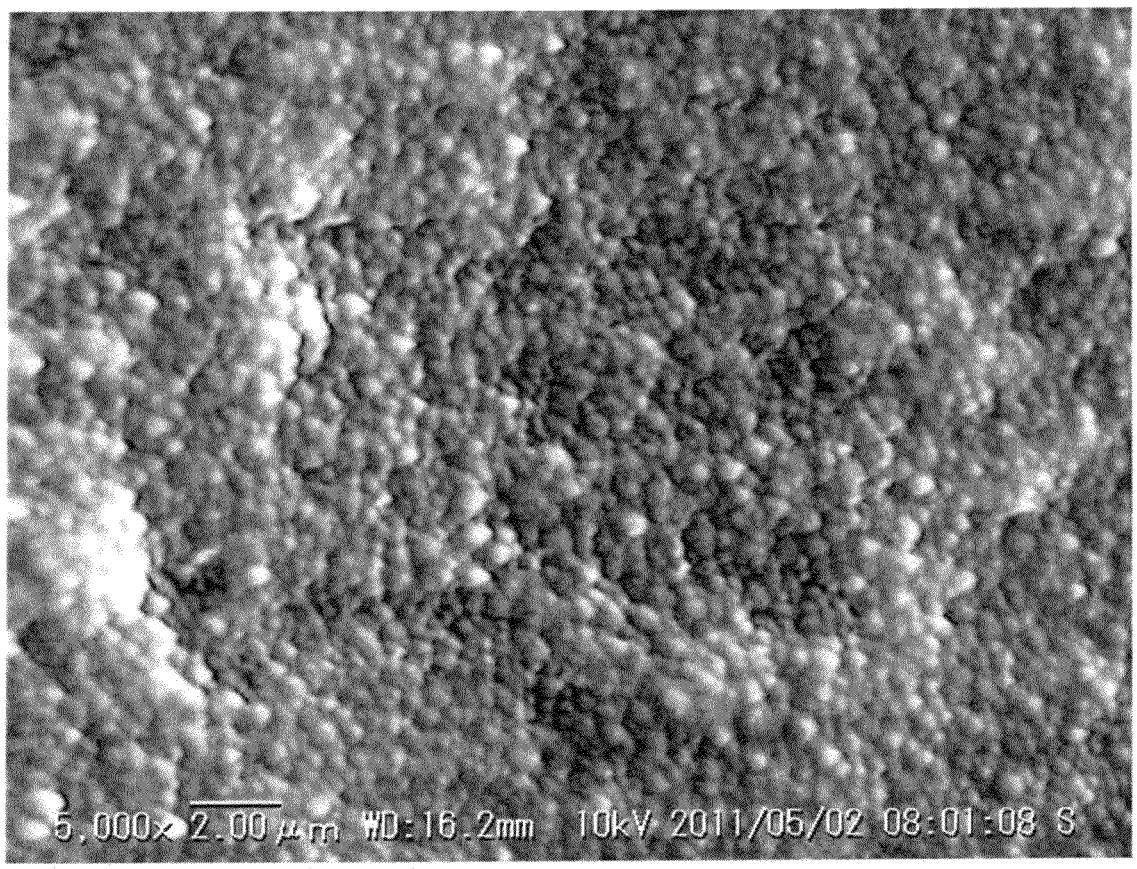
FIG. 3 is a photograph of a scanning electron microscope of a cross section of a pressed sheet at 200° C. obtained from the composition of Example 4 (5,000 folds).
Figure 4:
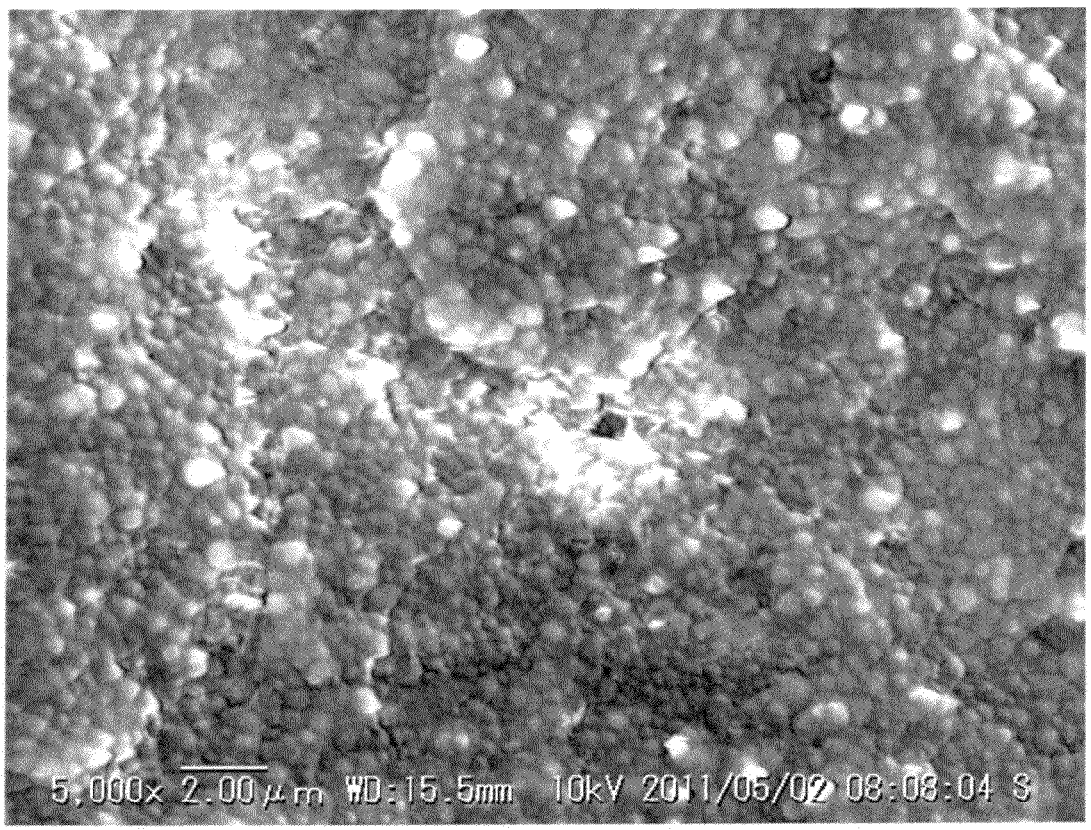
FIG. 4 is a photograph of a scanning electron microscope of a cross section of a pressed sheet at 230° C. obtained from the composition of Example 4 (5,000 folds).
Figure 5:
FIG. 5 is a photograph of a scanning electron microscope of a cross section of a pressed sheet at 230° C. obtained from the composition of Comparative Example 1 (1,000 folds).
Figure 6:
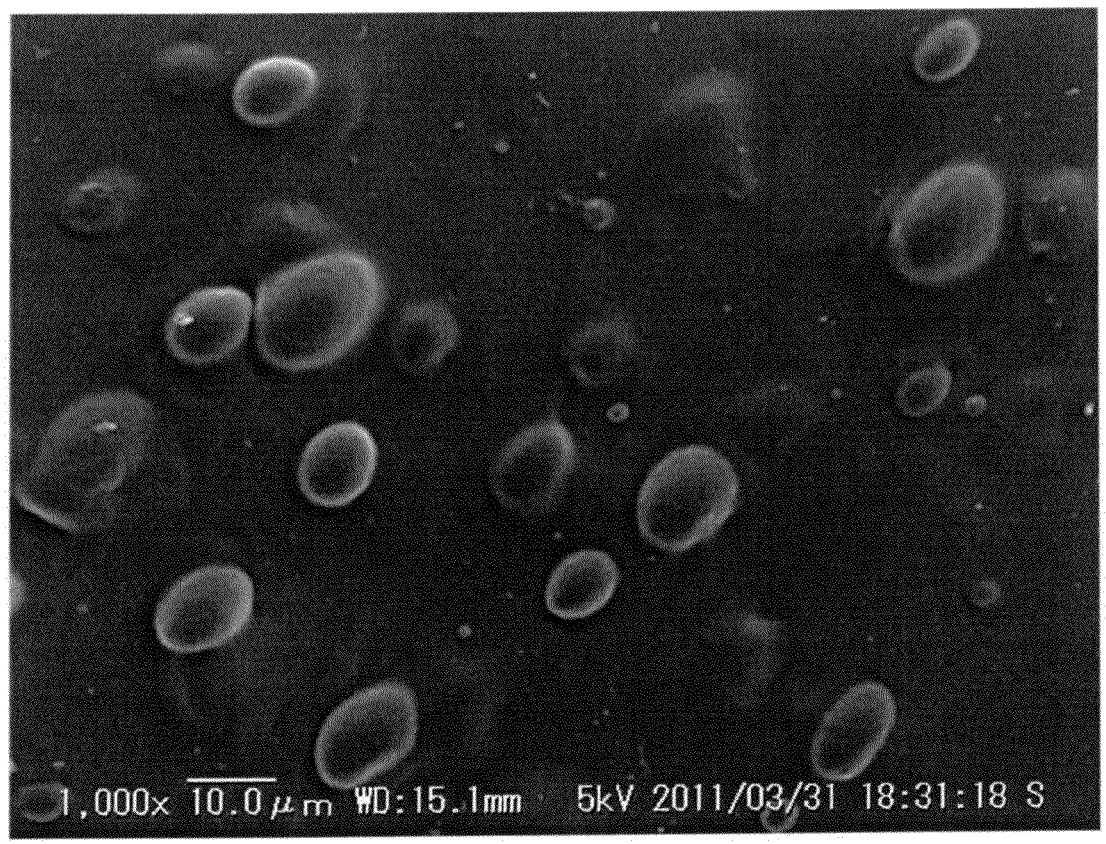
FIG. 6 is a photograph of a scanning electron microscope of a cross section of a pressed sheet at 230° C. obtained from the composition of Comparative Example 3 (1,000 folds).

The electron photomicrographs of the cross sections of the 200° C. pressed sheets and/or the 230° C. pressed sheets of the compositions obtained in Examples 1 and 4 and Comparative Examples 1 and 3 are shown in FIGS. 1 to 6. Here, as the electron microscope for confirming the state of the dispersion phase, any one of a scanning electron microscope (SEM) and a transmission electron microscope (TEM) may be used, and the means which can distinctly make observations depending upon the samples may be selected.

[Flow Beginning Temperature]

Rectangular strip test pieces having dimensions of a width of 12 mm×a length of 30 mm were cut out from the pressed sheets, and viscoelastic properties of each sample are measured with a dynamic viscoelasticity measurement instrument (TA Instruments, Model RSA-II) with settings of a torsion mode (10 gf load), a frequency of 10 Hz, a heating rate of 5° C./min, and temperatures of from 0° to 280° C.

The inflection point of the storage modulus obtained, or a temperature that would be undeterminable is defined as a flow beginning temperature. Here, although an inflection point of the storage modulus also appears near a glass transition temperature, no flow takes place, so that this point does not correspond to the flow beginning temperature.

[Tensile Properties (Tensile Strength at Break and Tensile Elongation at Break)]

No. 3 test pieces as prescribed in JIS K7113 are prepared with a die-pressing machine from a pressed sheet, and the test pieces are pulled with a tensile tester manufactured by Shimadzu Corporation (Autograph model AG-50kND) at a rate of 200 mm/min under temperature environmental conditions of 23° C. The stress and the elongation at break of the test piece were recorded as strength at break and elongation at break, respectively.

TABLE 6

| | | | Ex. | | | | | | | | |
|---|---|---|---|---|---|---|---|---|---|---|---|
| | | | 1 | 2 | 3 | 4 | 5 | 6 | 7 | 8 | 9 |
| Raw Material Components | Acrylic Triblock Elastomer | A1 | 70 | 70 | 70 | 70 | 70 | 70 | 70 | 70 | — |
| | Acrylic Triblock Elastomer | A2 | — | — | — | — | — | — | — | — | 70 |
| | Crystalline Polyester Resin | B1 | 30 | 30 | 30 | 30 | 30 | — | — | 30 | 30 |
| | Crystalline Polyester Resin | B2 | — | — | — | — | — | 30 | — | — | — |
| | Aromatic Polyamide Resin | B3 | — | — | — | — | — | — | 30 | — | — |
| | Syndiotactic Polystyrene Resin | B'1 | — | — | — | — | — | — | — | — | — |
| | Epoxy Group-Containing Acrylic Resin | C2 | 0.3 | 0.9 | 1.5 | 3 | 3 | 3 | 0.3 | 3 | 3 |
| | Epoxy Group-Containing Polyolefin Resin | C'1 | — | — | — | — | — | — | — | — | — |
| | Epoxy Group-Containing Polyolefin Resin | C'2 | — | — | — | — | — | — | — | — | — |
| | Metal Salt of Aliphatic Carboxylic Acid | D1 | 0.01 | 0.01 | 0.01 | 0.01 | — | 0.01 | 0.01 | — | — |
| | | D2 | — | — | — | — | — | — | — | 0.01 | 0.01 |
| | Transesterification Catalyst | E1 | — | — | — | — | — | — | — | — | — |
| A Hardness | 200° C. Pressed Sheet | | 60 | 46 | 56 | 41 | 43 | 43 | 53 | 44 | 83 |
| | 230° C. Pressed Sheet | | 64 | 56 | 52 | 47 | 44 | 45 | 51 | 43 | 85 |
| Ratio of A Hardness | 200° C. Pressed Sheet/ 230° C. Pressed Sheet | | 0.94 | 0.82 | 1.08 | 0.87 | 0.98 | 0.96 | 1.04 | 1.02 | 0.98 |
| Average Particle Size (μm) | 200° C. Pressed Sheet | | 0.45 | 0.39 | 0.37 | 0.37 | 0.35 | 0.39 | 0.31 | 0.41 | 0.36 |
| | 230° C. Pressed Sheet | | 0.56 | 0.40 | 0.45 | 0.49 | 0.45 | 0.42 | 0.38 | 0.46 | 0.41 |
| Ratio of Average Particle Sizes | 200° C. Pressed Sheet/ 230° C. Pressed Sheet | | 0.80 | 0.97 | 0.82 | 0.75 | 0.78 | 0.93 | 0.82 | 0.89 | 0.88 |
| Maximum Particle Size (μm) | 200° C. Pressed Sheet | | 0.60 | 0.76 | 0.60 | 0.60 | 0.66 | 0.64 | 0.44 | 0.56 | 0.58 |
| | 230° C. Pressed Sheet | | 1.1 | 1.1 | 0.64 | 0.88 | 0.92 | 0.79 | 0.65 | 0.72 | 0.78 |
| Flow Beginning Temperature (° C.) | 200° C. Pressed Sheet | | 214 | 211 | 213 | 217 | 213 | 213 | 208 | 213 | 220 |
| | 230° C. Pressed Sheet | | 202 | 208 | 208 | 214 | 209 | 203 | 206 | 209 | 217 |
| Tensile Properties, 230° C. Pressed Sheet | Strength at Break (MPa) | | 4.8 | 4.6 | 6.5 | 5.6 | 5.4 | 6.4 | 5.8 | 6.0 | 12.3 |
| | Elongation at Break (%) | | 183 | 204 | 207 | 251 | 231 | 221 | 242 | 244 | 154 |

| | | | Comp. Ex. | | | | | |
|---|---|---|---|---|---|---|---|---|
| | | | 1 | 2 | 3 | 4 | 5 | 6 |
| Raw Material Components | Acrylic Triblock Elastomer | A1 | 70 | 70 | 70 | 70 | 70 | 70 |
| | Acrylic Triblock Elastomer | A2 | — | — | — | — | — | — |
| | Crystalline Polyester Resin | B1 | 30 | 30 | 30 | 30 | — | — |

TABLE 6-continued

| | | | | | | | | |
|---|---|---|---|---|---|---|---|---|
| | Crystalline Polyester Resin | B2 | — | — | — | — | 30 | — |
| | Aromatic Polyamide Resin | B3 | — | — | — | — | — | — |
| | Syndiotactic Polystyrene Resin | B'1 | — | — | — | — | — | 30 |
| | Epoxy Group-Containing Acrylic Resin | C2 | — | — | — | — | — | 3 |
| | Epoxy Group-Containing Polyolefin Resin | C'1 | 3 | — | — | — | — | — |
| | Epoxy Group-Containing Polyolefin Resin | C'2 | — | 3 | — | — | — | — |
| | Metal Salt of Aliphatic Carboxylic Acid | D1 | 0.01 | 0.01 | — | — | — | — |
| | | D2 | — | — | — | — | — | — |
| | Transesterification Catalyst | E1 | — | — | — | 1 | — | — |
| A Hardness | 200° C. Pressed Sheet | | 71 | 61 | 66 | 57 | 66 | 64 |
| | 230° C. Pressed Sheet | | 30 | 31 | 30 | 38 | 30 | 33 |
| Ratio of A Hardness | 200° C. Pressed Sheet/ 230° C. Pressed Sheet | | 2.37 | 1.97 | 2.20 | 1.50 | 2.20 | 1.94 |
| Average Particle Size (μm) | 200° C. Pressed Sheet | | 3.00 | 2.83 | 6.29 | 0.41 | 2.80 | 2.70 |
| | 230° C. Pressed Sheet | | 12.00 | 10.17 | 12.00 | 1.12 | 10.73 | 12.50 |
| Ratio of Average Particle Sizes | 200° C. Pressed Sheet/ 230° C. Pressed Sheet | | 0.25 | 0.28 | 0.52 | 0.36 | 0.26 | 0.22 |
| Maximum Particle Size (μm) | 200° C. Pressed Sheet | | 1.50 | 1.7 | 4.40 | 0.62 | 1.40 | 2.30 |
| | 230° C. Pressed Sheet | | 19.2 | 12.4 | 13.2 | 2.3 | 13.3 | 18.4 |
| Flow Beginning Temperature (° C.) | 200° C. Pressed Sheet | | 213 | 215 | 213 | 210 | 213 | 274 |
| | 230° C. Pressed Sheet | | 151 | 147 | 143 | 148 | 152 | 149 |
| Tensile Properties, 230° C. Pressed Sheet | Strength at Break (MPa) | | 4.1 | 3.5 | 4.2 | 5.1 | 4.3 | 3.7 |
| | Elongation at Break (%) | | 270 | 272 | 254 | 314 | 204 | 195 |

Note)

The pressed sheets used in the measurements of physical property values such as A hardness are listed as "200° C. Pressed Sheet" or "230° C. Pressed Sheet" depending upon the molding temperatures, except only for Comparative Example 6 "250° C. Pressed Sheet" or "280° C. Pressed Sheet" molded at 250° C. or 280° C. matching a melting point of B'1 used in the raw material is used.

TABLE 7

| | | | Ex. 10 | Ex. 11 | Ex. 12 | Ex. 13 | Comp. Ex. 7 | Comp. Ex. 8 | Comp. Ex. 9 | Comp. Ex. 10 |
|---|---|---|---|---|---|---|---|---|---|---|
| Raw Material Components | Acrylic Triblock Elastomer | A1 | 50 | 60 | 80 | 85 | 80 | 80 | 80 | — |
| | Crystalline Polyester Resin | B1 | 50 | 40 | 20 | 15 | 20 | 20 | 20 | 30 |
| | Epoxy Group-Containing Acrylic Resin | C2 | 3 | 3 | 3 | 3 | — | — | — | 3 |
| | Epoxy Group-Containing Acrylic Rubber | A'1 | — | — | — | — | — | — | — | 70 |
| | | C'3 | — | — | — | — | — | 5 | — | — |
| | Carboxylic Acid-Containing Ethylene Acrylic Rubber | C'4 | — | — | — | — | — | — | 5 | — |
| | Metal Salt of Aliphatic Carboxylic Acid | D1 | 0.01 | 0.01 | 0.01 | 0.01 | — | 0.01 | — | — |
| Transesterification Catalyst | | E1 | — | — | — | — | 1 | — | — | — |
| A Hardness | 200° C. Pressed Sheet | | 80 | 75 | 41 | 27 | 50 | 32 | 32 | * |
| | 230° C. Pressed Sheet | | 77 | 72 | 38 | 22 | 25 | 23 | 24 | |
| Ratio of A Hardness | 200° C. Pressed Sheet/ 230° C. Pressed Sheet | | 1.04 | 1.04 | 1.08 | 1.23 | 2.00 | 1.39 | 1.33 | |
| Average Particle Size (μm) | 200° C. Pressed Sheet | | 0.38 | 0.41 | 0.36 | 0.24 | 0.28 | 0.42 | 0.39 | |
| | 230° C. Pressed Sheet | | 0.43 | 0.45 | 0.40 | 0.27 | 0.57 | 0.78 | 0.72 | |
| Ratio of Average Particle Sizes | 200° C. Pressed Sheet/ 230° C. Pressed Sheet | | 0.88 | 0.91 | 0.90 | 0.89 | 0.50 | 0.54 | 0.54 | |
| Maximum Particle Size (μm) | 200° C. Pressed Sheet | | 0.84 | 0.73 | 0.45 | 0.38 | 0.44 | 0.52 | 0.50 | |
| | 230° C. Pressed Sheet | | 1.56 | 1.23 | 0.53 | 0.46 | 1.04 | 1.31 | 1.85 | |
| Flow Beginning Temperature (° C.) | 200° C. Pressed Sheet | | 231 | 222 | 219 | 208 | 222 | 215 | 211 | |
| | 230° C. Pressed Sheet | | 219 | 210 | 209 | 203 | 143 | 138 | 129 | |
| Tensile Properties, 230° C. Pressed Sheet | Strength at Break (MPa) | | 4.6 | 4.9 | 6.4 | 5.8 | 6.8 | 2.8 | 2.6 | |
| | Elongation at Break (%) | | 236 | 253 | 514 | 451 | 486 | 374 | 459 | |

*: At the stage of melt-kneading, the raw materials could not be mixed in a molten state, so that the powders are present in fragmented state, thereby making it impossible to obtain samples as a thermoplastic elastomer compostiion.

TABLE 8

|  |  | Ex. 3 | Ex. 14 | Ex. 15 | Ex. 16 | Ex. 17 | Ex. 18 | Ex. 19 | Ex. 20 |
|---|---|---|---|---|---|---|---|---|---|
| Raw Material Components | Acrylic Triblock Elastomer A1 | 70 | 70 | 70 | 70 | 70 | 70 | 70 | 70 |
|  | Crystalline Polyester Resin B1 | 30 | 30 | 30 | 30 | 30 | 30 | 30 | 30 |
|  | Epoxy Group-Containing Acrylic Resin C2 | 1.5 | 1.5 | — | — | — | — | 1.5 | 1.5 |
|  | Epoxy Group-Containing Acrylic Resin C1 | — | — | 1.5 | 1.5 | 1.5 | — | — | — |
|  | Epoxy Group-Containing Acrylic Resin C3 | — | — | — | — | — | 1.5 | — | — |
|  | Epoxy Group-Containing Acrylic Resin C'5 | — | — | — | — | — | — | — | — |
|  | Metal Salt of Aliphatic Carboxylic Acid D1 | 0.01 | 0.01 | 0.01 | 0.01 | 0.01 | 0.01 | — | — |
|  | Transesterification Catalyst E1 | — | 1 | — | 0.8 | 1 | — | — | 1 |
|  | E2 | — | — | — | — | — | — | 1 | — |
|  | Phosphorus-Containing Thermal Stabilizer PEP-36 | — | — | — | — | — | — | — | 1 |
| A Hardness | 200° C. Pressed Sheet | 56 | 57 | 51 | 59 | 61 | 53 | 59 | 63 |
|  | 230° C. Pressed Sheet | 52 | 50 | 56 | 56 | 52 | 62 | 61 | 56 |
| Ratio of A Hardness | 200° C. Pressed Sheet/ 230° C. Pressed Sheet | 1.08 | 1.14 | 0.91 | 1.05 | 1.17 | 0.85 | 0.97 | 1.13 |
| Maximum Particle Size (μm) | 200° C. Pressed Sheet | 0.60 | 0.58 | 0.49 | 0.48 | 0.50 | 0.64 | 0.63 | 0.62 |
|  | 230° C. Pressed Sheet | 0.64 | 0.6 | 0.54 | 0.51 | 0.56 | 0.69 | 0.66 | 0.65 |
| Flow Beginning Temperature (° C.) | 200° C. Pressed Sheet | 213 | 216 | 212 | 214 | 213 | 213 | 214 | 212 |
|  | 230° C. Pressed Sheet | 208 | 209 | 207 | 208 | 207 | 208 | 208 | 232 |
| Tensile Properties, 230° C. Pressed Sheet | Strength at Break (MPa) | 6.5 | 9.7 | 5.8 | 6.0 | 7.4 | 5.3 | 7.7 | 8.4 |
|  | Elongation at Break (%) | 207 | 259 | 248 | 311 | 252 | 193 | 243 | 231 |

TABLE 9

|  |  |  | Ex. 21 | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|---|---|
| Raw Material Components | Acrylic Triblock Elastomer | A1 | 60 | 50 | — | — | 70 | 70 | 70 | 40 | 70 | 70 |
|  | Acrylic Triblock Elastomer | A3 | — | — | 60 | 60 | — | — | — | — | — | — |
|  | Crystalline Polyester Resin | B1 | 40 | 50 | 40 | 40 | 30 | — | — | — | — | — |
|  | Crystalline Polyester Resin | B4 | — | — | — | — | — | 30 | — | — | — | — |
|  | Crystalline Polyester Resin | B5 | — | — | — | — | — | — | — | — | 30 | — |
|  | Crystalline Polyester Resin | B6 | — | — | — | — | — | — | 30 | — | — | — |
|  | Crystalline Polyester Resin | B7 | — | — | — | — | — | — | — | — | — | 30 |
|  | Aromatic Polyamide | B8 | — | — | — | — | — | — | — | 60 | — | — |
|  | Epoxy Group-Containing Acrylic Resin | C2 | 8 | 15 | 2 | 8 | 2 | 3 | 3 | 1 | 3 | 3 |
|  | Metal Salt of Aliphatic Carboxylic | D1 | 0.001 | 0.001 | 0.001 | 0.001 | 0.001 | — | — | — | — | — |
|  | Transesterification Catalyst | E1 | — | — | — | — | 0.3 | — | — | — | — | — |
|  | Phenol-Based Thermal Stabilizer | Irganox1010 | 0.5 | 0.5 | 0.5 | 0.5 | — | — | — | — | — | — |
|  | Sulfur-Containing Thermal Stabilizer | TPL-R | 0.5 | 0.5 | 0.5 | 0.5 | — | — | — | — | — | — |
|  | Mixed Thermal Stabilizer | B-225 | — | — | — | — | 0.2 | 0.3 | 0.3 | 0.2 | 0.3 | 0.3 |
|  | Heavy Metal Deactivating Agent | CDA-6 | — | — | — | — | 0.3 | — | — | — | — | — |
| A Hardness | Pressed Sheet L |  | 63 | 95 | 66 | 78 | 58 | 58 | 59 | 87 | 55 | 53 |
|  | Pressed Sheet H |  | 68 | 98 | 71 | 80 | 62 | 61 | 57 | 85 | 58 | 59 |
| Ratio of A Hardness | Pressed Sheet L/Pressed Sheet H |  | 0.93 | 0.97 | 0.93 | 0.98 | 0.94 | 0.95 | 1.04 | 1.02 | 1.05 | 1.11 |
| Average Particle Size (μm) | Pressed Sheet L |  | 0.95 | 2.56 | 0.76 | 1.08 | 0.34 | 1.54 | 0.2 | 0.78 | 0.82 | 0.76 |
|  | Pressed Sheet H |  | 1.01 | 3.12 | 0.93 | 0.89 | 0.39 | 1.95 | 0.32 | 0.98 | 1.05 | 0.99 |
| Ratio of Average Particle Sizes | Pressed Sheet L/Pressed Sheet H |  | 0.93 | 0.82 | 0.82 | 1.21 | 0.87 | 0.79 | 0.63 | 0.80 | 1.28 | 1.30 |
| Maximum Particle Size (μm) | Pressed Sheet L |  | 1.52 | 4.8 | 1.24 | 1.76 | 0.61 | 2.87 | 0.22 | 0.92 | 1.01 | 0.89 |
|  | Pressed Sheet H |  | 1.82 | 5.7 | 1.74 | 1.92 | 0.65 | 3.20 | 0.42 | 1.32 | 1.42 | 1.29 |

TABLE 9-continued

|  |  | Ex. 21 | Ex. 22 | Ex. 23 | Ex. 24 | Ex. 25 | Ex. 26 | Ex. 27 | Ex. 28 | Ex. 29 | Ex. 30 |
| --- | --- | --- | --- | --- | --- | --- | --- | --- | --- | --- | --- |
| Flow Beginning | Pressed Sheet L | 235 | 236 | 223 | 227 | 211 | 251 | 229 | 267 | 249 | 220 |
| Temperature (° C.) | Pressed Sheet H | 231 | 233 | 219 | 222 | 209 | 248 | 223 | 265 | 239 | 212 |
| Tensile Properties, 230° C. | Strength at Break (MPa) | 8 | 11 | 10 | 11 | 8 | 8.9 | 8.6 | 6.9 | 4.9 | 5.3 |
| Pressed Sheet | Elongation at Break (%) | 226 | 98 | 137 | 147 | 275 | 256 | 243 | 115 | 255 | 276 |

Note)
Pressed Sheet L:
Ex. 21-25 200° C. Pressed Sheet
Ex. 26 235° C. Pressed Sheet
Ex. 27 210° C. Pressed Sheet
Ex. 28 245° C. Pressed Sheet
Ex. 29 235° C. Pressed Sheet
Ex. 30 210° C. Pressed Sheet
Pressed Sheet H:
Ex. 21-25 230° C. Pressed Sheet
Ex. 26 265° C. Pressed Sheet
Ex. 27 240° C. Pressed Sheet
Ex. 28 275° C. Pressed Sheet
Ex. 29 265° C. Pressed Sheet
Ex. 30 240° C. Pressed Sheet It can be seen from the above results that the compositions of Examples 1 to 20 do not have significant differences between the 200° C. (temperature L) pressed sheet and the 230° C. (temperature H) pressed sheet in the A hardness, the dispersion state of the dispersed phase, and the flow beginning temperature, and have excellent tensile properties (tensile strength and elongation), as compared to Comparative Example 10 where the component A is not blended, Comparative Example 6 where the component B is not blended, and the compositions of 1 to 5 and 7 to 9 where the component C is not blended.

As to the compositions of Examples 24 and 25 and the commercially product of the polyester elastomer, heat-aging property, acid resistance and oil resistance were tested and evaluated in accordance with the following methods. The results are shown in Table 10.

[Heat-Aging Property (JIS K 7212)]
The same test piece as that used in the test for the tensile properties is prepared, and the test piece is hanged in a gear oven (manufactured by TOYO SEIKI SEISAKU-SHO, LTD., Model S45), setting a temperature to 150° C. After 1,000 hours from the beginning of the test, the test piece is allowed to stand for one day in a thermostat held at 23° C., and the test piece is temperature-controlled, and thereafter subjected to a tensile test.

[Acid Resistance (JIS K 7114, ISO 175)]
The same test piece as that used in the test for the tensile properties is prepared, and the test piece is immersed in a 35% hydrochloric acid (manufactured by Wako Pure Chemical Industries, Ltd., special grade reagent), and allowed to stand in a thermostat at 23° C. After 168 hours from the beginning of immersion, a test piece is taken out, and subjected to a tensile test.

[Oil Resistance (JIS K 7114, ISO 175)]
The same test piece as that used in the test for the tensile properties is prepared, and the test piece is immersed in a rubber-resistant liquid test oil (manufactured by JAPAN SUN OIL COMPANY LTD., IRM903), and allowed to stand in a thermostat at 23° C. After 168 hours from the beginning of immersion, a test piece is taken out, and subjected to a tensile test.

TABLE 10

|  | Tensile Test Results and Keeping Ratio |  | Ex. 25 | Ex. 24 | TPEE-1 | TPEE-2 |
| --- | --- | --- | --- | --- | --- | --- |
| Heat-Aging Property, at 150° C. | Initial Value | Strength at Break (MPa) | 8 | 11 | 26 | 16 |
|  |  | Elongation at Break (%) | 275 | 147 | 688 | 899.0 |
|  | After 1,000 Hours | Strength at Break (MPa) | 11 | 13 | 9 | degraded |
| After 1,000 Hours |  | Elongation at Break (%) | 171 | 93 | 5 | degraded |
|  | Keeping Ratio | Strength at Break | 138% | 118% | 35% | 0% |
|  |  | Elongation at Break | 62% | 63% | 1% | 0% |
| Acid Resistance Hydrochloric acid 23° C. After 168 Hours | Initial Value | Strength at Break (MPa) | 8 | 11 | 26 | 16 |
|  |  | Elongation at Break (%) | 275 | 147 | 688 | 899 |
|  | After 168 Hours | Strength at Break (MPa) | 9 | 12 | degraded | degraded |
|  |  | Elongation at Break (%) | 241 | 114 | degraded | degraded |
|  | Keeping Ratio | Strength at Break | 113% | 109% | 0% | 0% |
|  |  | Elongation at Break | 88% | 78% | 0% | 0% |
| Oil Resistance IRM No. 903 Oil 23° C. After 168 Hours | Initial Value | Strength at Break (MPa) | 8 | 11 | 26 | 16 |
|  |  | Elongation at Break (%) | 275 | 147 | 688 | 899 |
|  | After 168 Hours | Strength at Break (MPa) | 7 | 9 | 27 | 19 |
|  |  | Elongation at Break (%) | 242 | 128 | 683 | 1078 |
|  | Keeping Ratio | Strength at Break | 87% | 82% | 104% | 119% |
|  |  | Elongation at Break | 88% | 87% | 99% | 120% |

Note
1) Keeping Ratio: (Value After Given Time Period)/(Initial Value) × 100

Note
1) TPEE-1: Butylene/poly(alkylene ether) phthalate
TPEE-2: Polyester-polyether block copolymer, PELPRENE P-30B (manufactured by TOYOBO CO., LTD.), polycondensate of butane-1,4-diol and polybutylene glycol terephthalate, D hardness 29

It can be seen from the above results that the thermoplastic elastomer compositions of the present invention have excellent thermal aging property, and excellent acid resistance and oil resistance, as compared to the conventionally commercially available polyester elastomers, so that the thermoplastic elastomer compositions also have excellent chemical resistance.

INDUSTRIAL APPLICABILITY

The molded article obtainable from the thermoplastic elastomer composition of the present invention can be used in various kinds of fields such as electric and electronic parts, automotive parts, sealants, packing, vibration proofed materials, and tubes.

The invention claimed is:

1. A thermoplastic elastomer composition comprising:
a (meth)acrylic elastomer (component A),
a thermoplastic resin having a melting point of from 180° to 350° C., and having a functional group reactive with an epoxy group (component B), and
a vinyl copolymer having a solubility in tetrahydrofuran and having an average of two or more epoxy groups in one molecule, (component C),
wherein proportions of each of said components are:
40 to 95 parts by weight of component A,
5 to 60 parts by weight of component B, and
0.1 to 30 parts by weight of component C, and
a total of component A and component B being 100 parts by weight,
wherein the component C comprises monomer units containing 50% by weight or more of monomer units (monomer unit c1) of which the SP value is from 17.5 to 25.0, and
wherein a flow beginning temperature is from 180° to 350° C.

2. A thermoplastic elastomer composition comprising:
a (meth)acrylic elastomer (component A)
a thermoplastic resin having a melting point of from 180° to 350° C., and having a functional group reactive with an epoxy group (component B), and
a vinyl copolymer having a solubility in tetrahydrofuran and having an average of two or more epoxy groups in one molecule, (component C),
wherein proportions of each of said components are:
40 to 95 parts by weight of component A,
5 to 60 parts by weight of component B, and
0.1 to 30 parts by weight of component C, and
a total of component A and component B is 100 parts by weight, and
wherein component C comprises monomer units containing 50% by weight or more of at least one monomer unit selected from the group consisting of (meth)acrylic monomers, styrene, and styrene derivatives (monomer unit c2), and the SP value is from 17.5 to 25.0, and
wherein a flow beginning temperature is from 180° to 350° C.

3. The thermoplastic elastomer composition according to claim 2, wherein the monomer units constituting component C comprise 10 to 90% by weight of one or more of the (meth)acrylic monomers, and 10 to 90% by weight of one or more of the styrene or styrene derivatives.

4. The thermoplastic elastomer composition according to claim 2, wherein the weight-average molecular weight of the vinyl copolymer (component C) is from 1,000 to 100,000.

5. The thermoplastic elastomer composition according to claim 2, wherein component A is a block copolymer comprising two or more blocks constituting a hard segment, and one or more blocks constituting a soft segment.

6. The thermoplastic elastomer composition according to claim 5, wherein the glass transition temperatures of the blocks constituting a hard segment are from 20° C. to 200° C., and the blocks constituting a soft segment are from −100° to 19° C.

7. The thermoplastic elastomer composition according to claim 2, wherein the weight-average molecular weight of component A is from 50,000 to 1,000,000.

8. The thermoplastic elastomer composition according to claim 2, wherein component B is an aromatic polyester and/or a polyamide.

9. The thermoplastic elastomer composition according to claim 2, further comprising a metal salt of an aliphatic carboxylic acid (component D) in an amount of from 0.001 to 10 parts by weight.

10. The thermoplastic elastomer composition according to claim 2, further comprising a transesterification catalyst (component E) in an amount of from 0.01 to 10 parts by weight.

11. The thermoplastic elastomer composition according to claim 2, obtained by thermally kneading raw material components comprising component A, component B and component C at a temperature of equal to or higher than a melting point of component B but lower than or equal to 350° C. with an extruder or a kneader.

12. A molded article obtained by heating the thermoplastic elastomer composition of claim 2 for 5 minutes with a hot press machine set with a high and low temperature setting, where $MP_B$ is the melting point of component B and said settings are determined as follows:
low temperature setting (L): $MP_B-20°$ C.±5° C.
high temperature setting (H): $MP_B+10°$ C.±5° C., and
wherein the molded article comprises a phase separation structure comprising a continuous phase and dispersed phase, and wherein a maximal particle size of the dispersed phase observed by an electron microscope is 5 μm or less.

13. A molded article obtained by heating the thermoplastic elastomer composition of claim 2 for 5 minutes with a hot press machines set with a high and low temperature setting, where $MP_B$ is the melting point of component B and said settings are determined as follows:
low temperature setting (L): $MP_B-20°$ C.±5° C.
high temperature setting (H): $MP_B+10°$ C.±5° C., and
wherein the molded article has an A hardness of from 20 to 90.

14. A molded article obtained by heating the thermoplastic elastomer composition of claim 2 for 5 minutes with a hot press machines set with a high and low temperature setting, where $MP_B$ is the melting point of component B and said settings are determined as follows:
low temperature setting (L): $MP_B-20°$ C.±5° C.
high temperature setting (H): $MP_B+10°$ C.±5° C., and
wherein the molded article has a ratio of the A hardness of from 0.6 to 1.3, wherein the ratio is determined as follows: A hardness of the molded article obtained by heating at a temperature L/A hardness of the molded article obtained by heating at a temperature H.

15. A molded article obtained by heating the thermoplastic elastomer composition of claim 2 for 5 minutes with a hot press machine set at a temperature H, which is within a range of $MP_B+10$ C±5 C, wherein $MP_B$ is the melting point of component B, and
wherein the molded article has a flow beginning temperature of from 180° to 350° C.

16. A molded article obtained by heating the thermoplastic elastomer composition of claim 2 for 5 minutes with a hot press machine set at a temperature H, which is within a range of $MP_B+10$ C±5 C, wherein $MP_B$ is the melting point of component B, and
   wherein the molded article has a tensile elongation at break of 100% or more.

17. The thermoplastic elastomer composition according to claim 2, wherein component C is from 0.1 to 15 parts by weight.

18. A molded article having a flow beginning temperature of from 180° to 350° C., obtained by thermally molding at 180° to 350° C. the thermoplastic elastomer composition of claim 2.

19. A molded article having a tensile elongation at break of 100% or more, obtained by thermally molding the thermoplastic elastomer composition of claim 2 at 180° to 350° C.

20. A molded article having an A hardness of from 20 to 90, obtained by thermally molding the thermoplastic elastomer composition of claim 2 at 180° to 350° C.

* * * * *